United States Patent [19]

Wilkinson et al.

[11] Patent Number: 4,701,750

[45] Date of Patent: Oct. 20, 1987

[54] MOTORCYCLE SOUND SIMULATOR FOR NON-MOTORIZED VEHICLE

[75] Inventors: James P. Wilkinson, Richfield; Thomas R. Halverson, Duluth, both of Minn.

[73] Assignee: Audio Science Investors Limited Partnership, Duluth, Minn.

[21] Appl. No.: 638,112

[22] Filed: Aug. 6, 1984

[51] Int. Cl.$^4$ .............................................. G08B 3/00
[52] U.S. Cl. .................................. 340/384 E; 273/86 B
[58] Field of Search ............ 340/52 R, 384 E, 384 R; 73/146, 488, 493, 494, 511; 273/1 E, 85 R, 86 G; 364/424

[56] References Cited

U.S. PATENT DOCUMENTS

| | | | |
|---|---|---|---|
| 2,359,294 | 10/1944 | Blenman | 340/384 E |
| 2,609,640 | 12/1949 | Newell et al. | |
| 2,633,097 | 3/1953 | Frew | |
| 2,660,973 | 12/1953 | Portlance | |
| 2,768,371 | 10/1956 | Konrad | 340/384 E |
| 2,898,587 | 8/1959 | Nye | 340/384 E |
| 2,974,424 | 3/1961 | Roberts | 340/384 E |
| 3,154,864 | 11/1964 | Jazbutis | |
| 3,160,984 | 12/1964 | Ryan | |
| 3,439,926 | 4/1969 | Bayard | |
| 3,718,987 | 3/1973 | Carver | 340/384 E |
| 3,831,172 | 8/1974 | Olliges | 340/384 E |
| 3,845,572 | 11/1974 | McCanney | 340/384 E |
| 3,875,696 | 4/1975 | Howland | |
| 3,913,097 | 10/1975 | Schedler | 340/384 E |
| 3,913,245 | 10/1975 | McCanney | 340/384 E |
| 4,071,892 | 1/1978 | Genzling | 73/493 |
| 4,086,578 | 4/1978 | Masili | 340/384 E |
| 4,196,528 | 4/1980 | Foerst | |
| 4,219,962 | 9/1980 | Dankman et al. | |
| 4,265,047 | 5/1981 | Meyer et al. | |
| 4,267,551 | 5/1981 | Dankman et al. | |
| 4,289,307 | 9/1981 | Marshall et al. | |
| 4,290,054 | 9/1981 | Magnani et al. | |
| 4,291,877 | 9/1981 | Ensmann et al. | |
| 4,314,236 | 2/1982 | Mayer et al. | |

FOREIGN PATENT DOCUMENTS 1440815  6/1976  United Kingdom ............ 340/384 E

OTHER PUBLICATIONS

Walmsley, Aircraft Sound and 'Hijack' Effects Generator, *Elektor,* Jul./Aug. 1979, vol. 51/52, No. 7-8.

Primary Examiner—John W. Caldwell, Sr.
Assistant Examiner—Tyrone Queen
Attorney, Agent, or Firm—Merchant, Gould, Smith, Edell, Welter & Schmidt

[57] ABSTRACT

A motorcycle sound simulator for non-motorized vehicles is disclosed having a sensor (16) to detect motion of a wheel (18) and transmit electrical signals to a control unit (12). The control unit, through its microprocessor, produces a firing period (520) which includes a pulse train burst (522) and silence (524) which are respectively altered in length to produce motorcycle-like sounds. Other motorcycle attributes such as shifting gears (514), acceleration (508), deceleration (512), misfire (516), and failure to start (504) are provided and audio output is generated with audible tones corresponding to a motorcycle-type sound.

10 Claims, 28 Drawing Figures

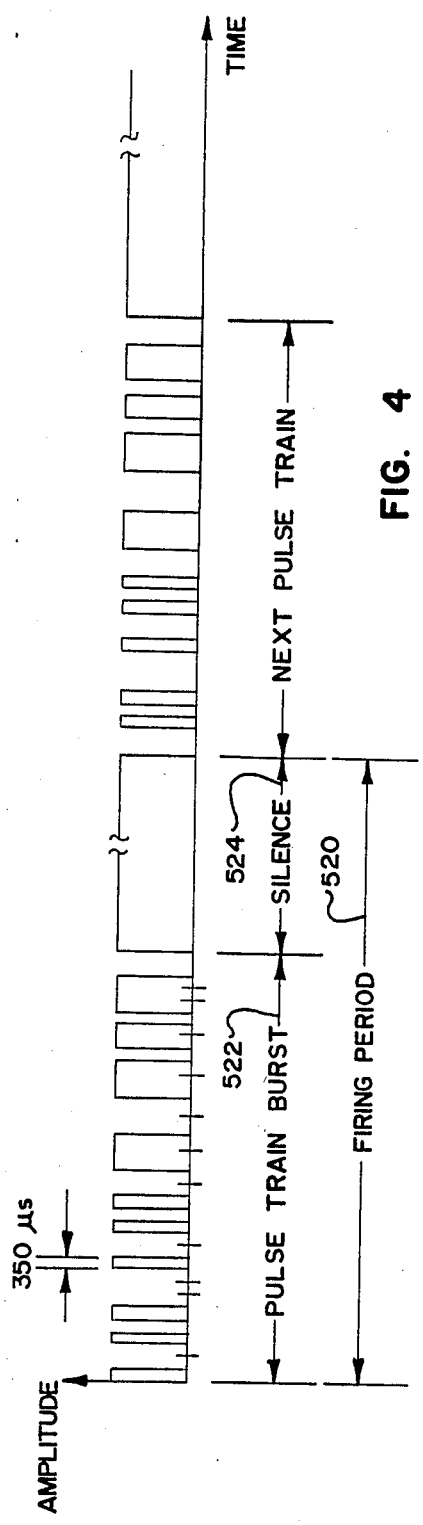
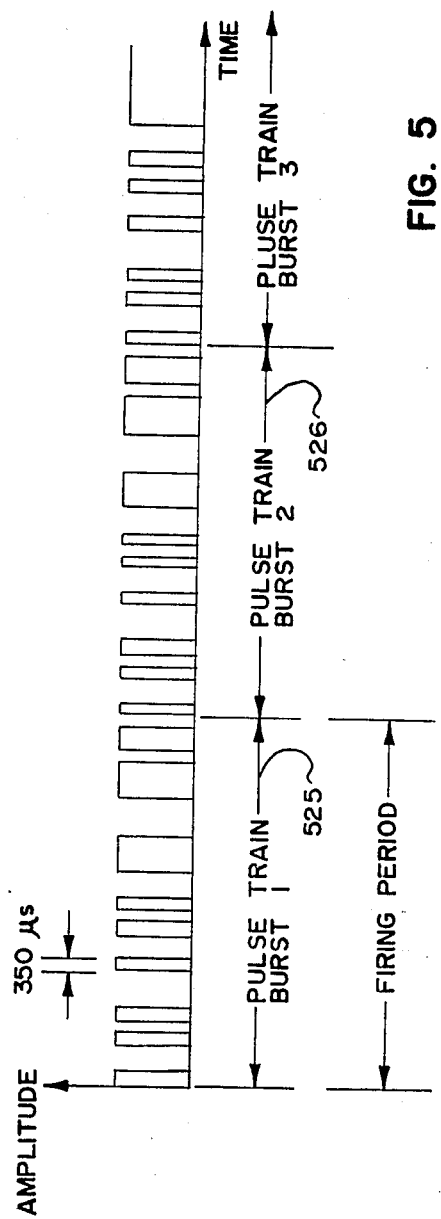
FIG. 4
FIG. 5

:20000000040900449900004467270785238FF393A0208B838A018B001B820BA0E27A018EA67
:200020001DB82FA018A0B82EB020B831B02318B03718B001B834B07F18B073B83BB000B879
:200040001AB001B837B0812524FCB928BA00EA4EE94CFBA083BD0ABE008662EE59ED57BD95
:2000600000083B938F1AC19F1ABBD0005A5B5766EB5EC6EEB6E158397FD1282727F0485A771
:200080004857285A7FC67ACFD67AD831455B82E10F0A903D2E69BB020B920FDA1BA0EB881
:2000A0002027AB6018E6A81BEAA3AD2BAE372B37B82F602B1870372B372BF2DC96CA2B0367
:2000C000EAF6CA0316B83AA0240CB83AB016B82F231660A0F6D82413181024133728B3717AF
:2000E00096E31B2B96F423F16BF6F4030F3717B83AA0240CB83AB0F1B82F23F160A0182363
:20010000FF70A0F613B000C8B0002413B82FFDA018FEA0B933F1070328E3A9BA1254D5AAF4
:2001200029ABBC0ECC6B297A29EC2529ACB82FF0AB18F0AAFC549DFFC63CBC73B831FC37CB
:200140001760E649B833102413B832F037176CE670B833F007966023BD6CE670BC732470D0
:20016000A0B835BB32BD04144ACBCBCBED672413B835FCA053F0777777770330E3B837A0AD
:20018000B82EF0A9F103FEE68C85249CB69195249C85B835B07B833B001048C23C86CE69D
:2001A000AAB831B02318B037048CB83AF0F2D0BB00BAFA6AE6B91B24B3FB3717ABB931F16D
:2001C0006BA103EEF6CAB112048C19F16BA1048C3717BB00BAFA6AE6DC1B24D6B932F16B24
:2001E000A103C9E6E9B137048CC9FB0707F2F761A103DDE6F7B123048C00000027AAABBC35
:20020000F361717EA01EB01EC01BA1427BB003937EB11EA0D24FCACB837B085B835B07394
:20022000B81AB001B83623FCA06255FC1253B93B11F103FDC653BBFC144ABBF9144AB83553
:20024000BBAF144ABBEB144A144A65364BBB00EB4F24FCBBFD144ABC38BD0AB835FC1CE3C0
:20026000AB144AED5D048CD5AFEA87B800B934F1AEBB28B935F1AA1477FD533F A9E97DB914
:2002800037F15D9687BB0AEB8DBB014492F818E34E39B936F162FFA5931D869A93AFFA96EB
:2002A000A7FB96A7BFFF83FFBF00BC00372937AE6B29AD7A29F6C11C2CC6BE2C44AFBFFF1B
:2002C0008397FA67AAFB67ABFE6BFD7AF6D41CFC96D4BFFF83BB0827976729GE06AAE
:2002E000EBD9672967298374422 9F78300000000000000000000000000000000003E
:20030000FF0F0FFFF0FFF0F0F0FFFF0F0FFFF0FFF0F0FFFFFFFF0F0F0FFFFFFFF0FFFFF0FFFFFD
:20032000FF0F0FFFFFFFFFFF161E2A3C50667E98FFFFE7A78585818150 3C23282D374150DB
:200340006473B9201183474F54434841FF0FFF0F0FFFFFFFF0F0F0FFFFFFF0FFFFF0FFFFF37
:20036000FF0F0FFFFFFFFFFF161E2A3C50667E98FFFFE7A78585818150 3C23282D3741509B
:000380017C

FIG. 28

MOTORCYCLE SOUND SIMULATOR FOR NON-MOTORIZED VEHICLE

TECHNICAL FIELD

The present invention relates to a device for generating realistic sounds of motorcycles and using such sound generators on other vehicles, typically non-motorized types, such as a bicycle.

BACKGROUND OF THE INVENTION

The popularity of off-the-road motorcycles known by their colloquial name "dirt bikes" has been growing steadily over the years and the sound of such motorcycles is easily identifiable by its "revving" sound.

More recently, bicycle manufacturers have been designing their smaller bicycles to have many of the appearance characteristics of such motorcycles, namely heavy duty wheels, knobby tires, strutted highrise handle bars, handle grips, and a sturdy low frame. There is in fact already a hobby of racing such bicycles on the same terrain as would be used for off-street motorcycles. To enhance the realism of these special bicycles, it would be desirable to simulate the sounds created by the motorized version thereof without actually adding motors to the bikes which would destroy their usefulness as safe toys.

It would be desirable to have this simulation realistically parallel the changes in acceleration and deceleration of the bicycle during its ride on an uneven track as well as some of the other characteristics of internal combustion engines, including misfire and failure to start.

The present invention provides such a simulator which is capable of monitoring the acceleration and velocity characteristics of the bicycle and producing appropriate sounds in response thereto.

SUMMARY OF THE INVENTION

The present invention is related to a motorcycle sound simulator for use in non-motorized vehicles having a sensor attached to the vehicle to detect and measure the rotation of a wheel and to generate an electrical signal therefrom, means capable of determining the relative velocity of the vehicle from the signal, means capable of determining the relative acceleration of the vehicle, and means for producing an audio output in response to the velocity in an acceleration, the output having audio characteristics corresponding to the sounds created by a motorcycle at like velocities and accelerations.

In accordance to further aspects of the invention, means are provided for step-wise continuous changes in the audio frequency, the changes occurring at particular velocities and accelerations producing audio characteristics corresponding to shifting of gears on a motorcycle.

A further aspect of the invention includes a starting sequence which randomly determines whether the attempted start of the simulator will produce a start sound or a failure to start sound.

According to a further aspect of the invention, means are provided to produce an intermittent audio output corresponding to a misfire of the motorcycle and the misfire being randomly generated with a probability which increases as the audio frequency increases.

According to a further aspect of the invention, the simulator includes a silent period of random length being inserted between the periodic sound generated to eliminate natural resonant sound caused by the periodic nature of the audio output, thereby leading to a cleaner and more realistic sound.

Various advantages and features of novelty which characterize the invention are pointed out with particularity in the claims annexed hereto and forming a part hereof. However, for a better understanding of the invention, its advantages, and objects attained by its use, reference should be made to the drawings which form a further part hereof and to the accompanying descriptive matter, in which are illustrated and described certain perferred embodiments of the invention.

BRIEF DESCRIPTION OF THE DRAWINGS

In the drawings wherein like numerals refer to like elements throughout the several views:

FIG. 4 is a representative trace of the audio output at idle;

FIG. 5 is a representative trace of the audio output at high speed;

FIG. 28 is an object code for the preferred embodiment.

DETAILED DESCRIPTION OF THE INVENTION

Figure 1:
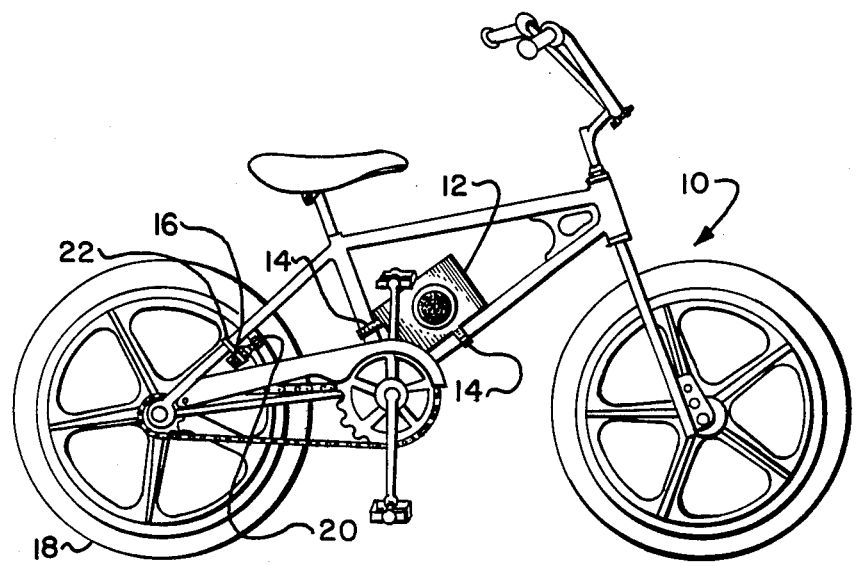
FIG. 1 is a side plan view of a bicycle having the preferred embodiment on the invention attached thereto.

Referring to FIG. 1, there is a bicycle 10 shown having mounted thereon an electronic control unit 12 attached by brackets 14 to the frame of bicycle 10, and a rotary sensor 16 also attached to the frame and which engages either the rubber sidewall of the rear wheel 18 or the rim thereof. Sensor 16 is, in the preferred embodiment, constructed similar to a permanent magnet generator known in the bicycle art for powering head and tail lights. Thus, sensor 16 includes a rotating portion 20 and a fixed portion 22 attached to the frame. The rotation of portion 20 generates an electrical signal or, alternatively, a variable resistance or a Hall-effect switch could be used to transmit interrupts (rather than generating a current) to the control 12 for interpretation by the electronics therein.

Figure 2:
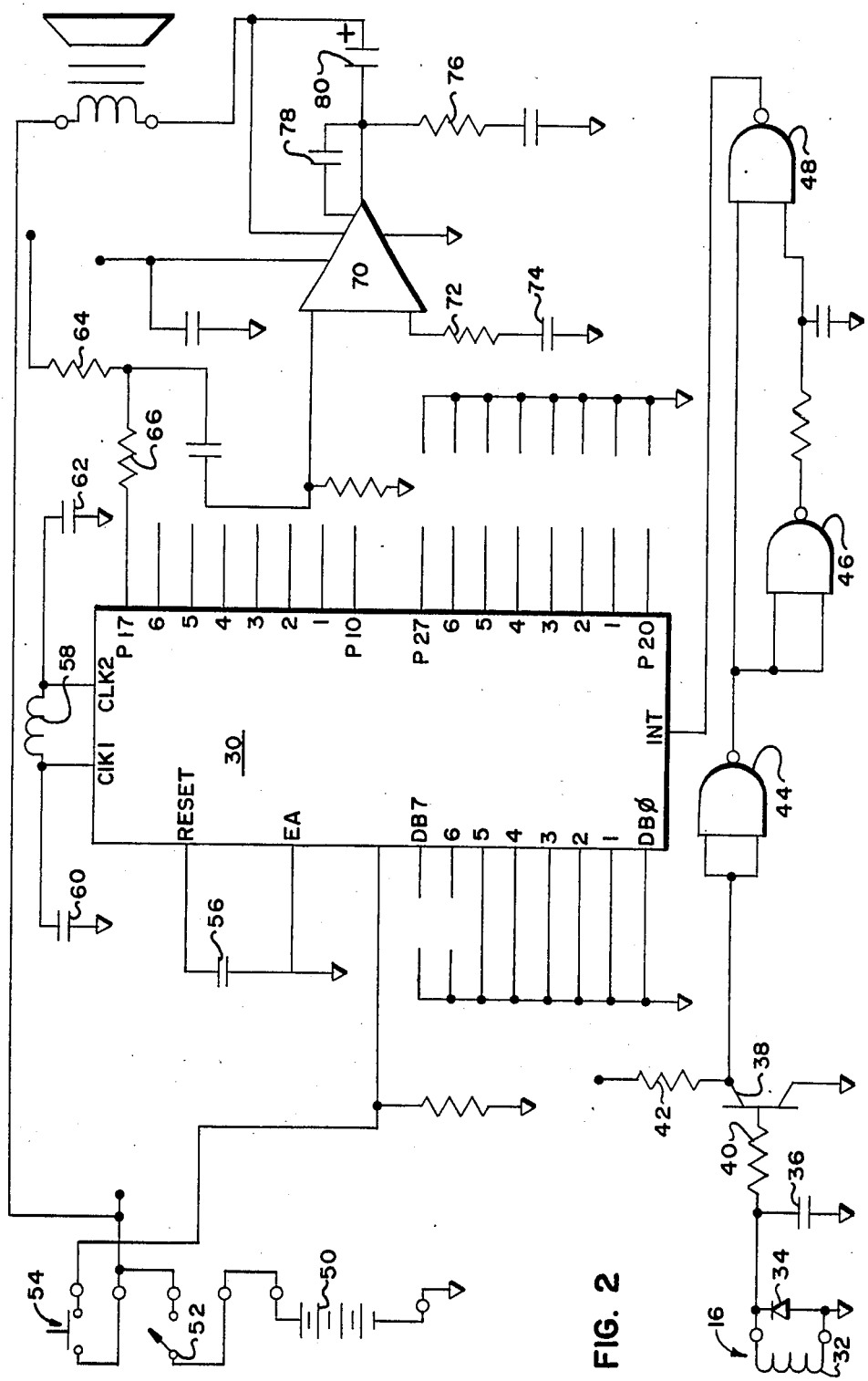
FIG. 2 is a schematic drawing of the logic circuitry of the preferred embodiment.

Turning to FIG. 2, namely the schematic diagram, there can be seen the essential features of the electronic circuitry within unit 12. At the heart of the system is a microprocessor 30 which, in the preferred embodiment, is an Intel 8048. The data input pins DB-0 to DB-7 are used only at initialization and it can be seen that the sample time frame of 192 units (of 350 microseconds each) is hardwired thereon. This value is the number of timer interrupts in the wheel sensor sample, as will be explained hereinafter. Pins P20-P27 are supplementary data inputs and are not presently used in the preferred embodiment.

Pins P10–P17 provide the audio output pulse train. In this embodiment, only P17 is used, however it will be appreciated by persons skilled in the art that different sounds and different amplitude levels can be obtained by using one or more of the other output pins. The wheel sensor 16 is indicated only in its fixed coil 32 and would be preferably characterized as a 12 pole permanent magnet generator which produces a sinewave whose frequency is proportional to the wheel rotation speed. Diode 34 eliminates the negative going pulses from the sinewave output and capacitor 36 provides a noise filter. Transistor 38, along with resistors 40 and 42, provide simple amplification and their output is fed into nand gates 44, 46 and 48 to produce a short pulse of approximately 10 microsecond output which in turn is input to the INT (interrupt) input of the microprocessor 30. The system is powered by a dry cell battery source 50 of six volts and is controlled by an On/Off switch 52. The actual "start" switch 54 must also be operated to initiate the audio sequence.

A capacitor 56 is applied across the reset and External Access (EA) and tied to ground inputs.

The clock inputs 1 and 2 have an L-C network applied across them including an inductor 58 and capacitors 60 and 62 which provide a clock frequency of approximately 5 megahertz.

At the output end of the circuit, output line P-17 is connected to a resistor network of resistors 64 and 66 which control the amplitude at their intersection point to be approximately 3.3 volts when P17 is at logic 0. When P17 is at logic 1, the junction will be pulled up to the VCC. The signal is then fed into a operational audio amplifier 70 which is configured as a non-inverting type with the speaker load connected between the output and VCC. Therefore, when the input is high the output will be high and visa-versa. Resistor 72 provides the gain of the amplifier preferably set at about 3 and capacitor 74 provides low frequency roll-off. Frequency compensation is provided by resistor 76 and capacitor 78 while capacitor 80 provides decoupling.

With the circuit shown in FIG. 2 in place, the sounds produced are controlled by a series of instructions programmed into the microprocessor. These instructions are provided in the form of flow-charts, which form the remaining drawings of this disclosure and should be understood by a person skilled in this art.

Figure 3:
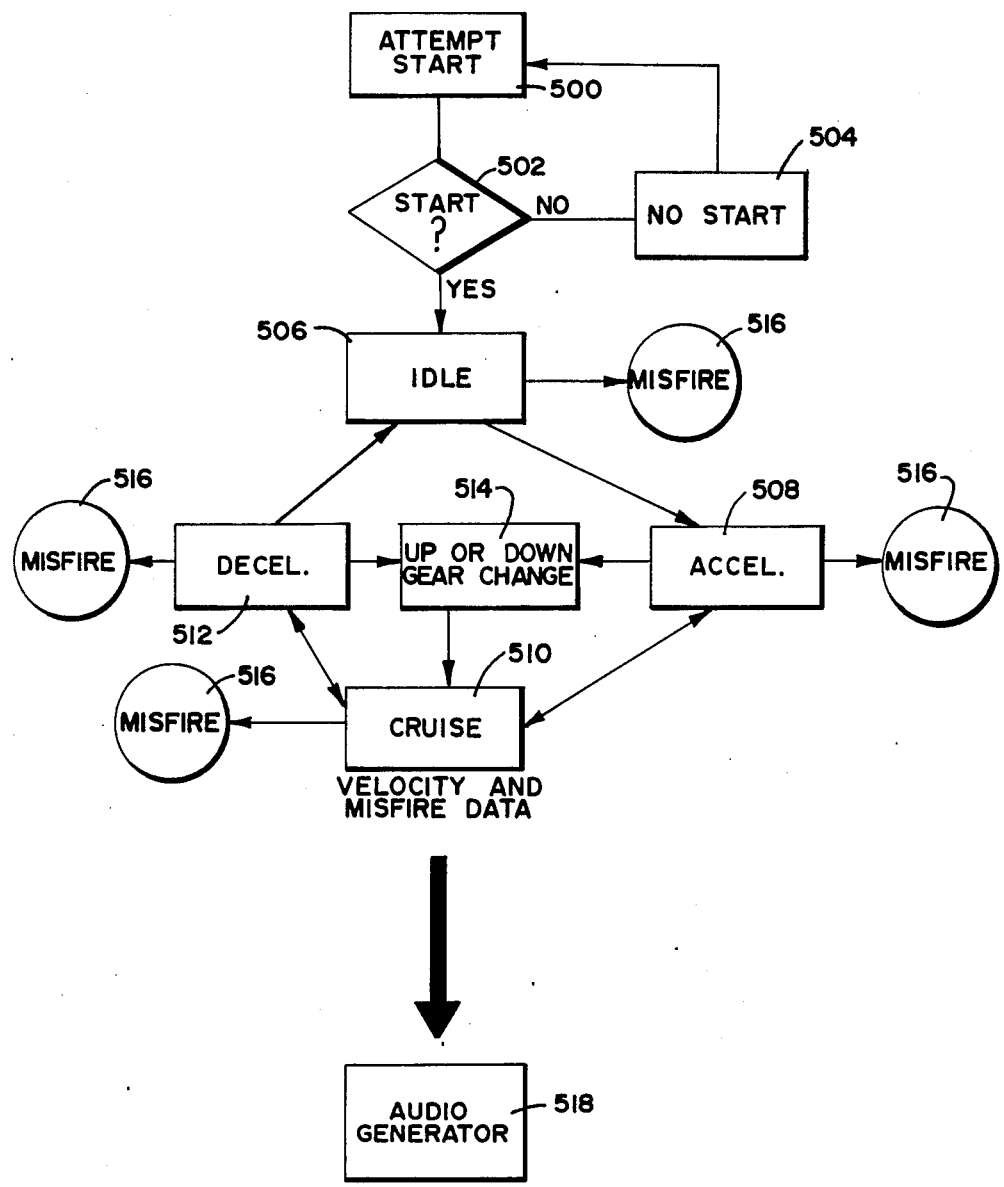
FIG. 3 is a representative flow chart of major functions of the preferred embodiment.

FIG. 3 of the drawing provides an overall conceptual understanding of the major aspects of the preferred embodiment of the present invention. After turning on the power, the operator will then depress the start switch thereby attempting to start the system (block 500). One of the features of the system is that by random generation, some of the intended starts will not produce an "ignition"(block 502) but rather a no start condition (block 504) which results in an increasing audio frequency followed by a decreasing to zero. If the start is successful, the system goes to an idle condition (block 506) which maintains a minimum audio frequency output. From there, motion of the wheel containing the sensor will produce an accelerating frequency (block 508) to a possible cruising frequency (block 510) from which there may be deceleration (block 512) or a gear change (block 514) which would cause a step-wise increase or decrease in audio frequency depending on whether it is a "upshift" or "downshift". In any of these conditions, a "misfire" may be produced (block 516) which results in an audio output characterized by an audio output of the type shown in FIG. 6 and corresponding to a misfire sound characteristic of a motorcycle.

By means of an interrupt in the microprocessor, the audio output is generated (block 518) which is related to the velocity and misfire data created as explained above.

Figure 6:
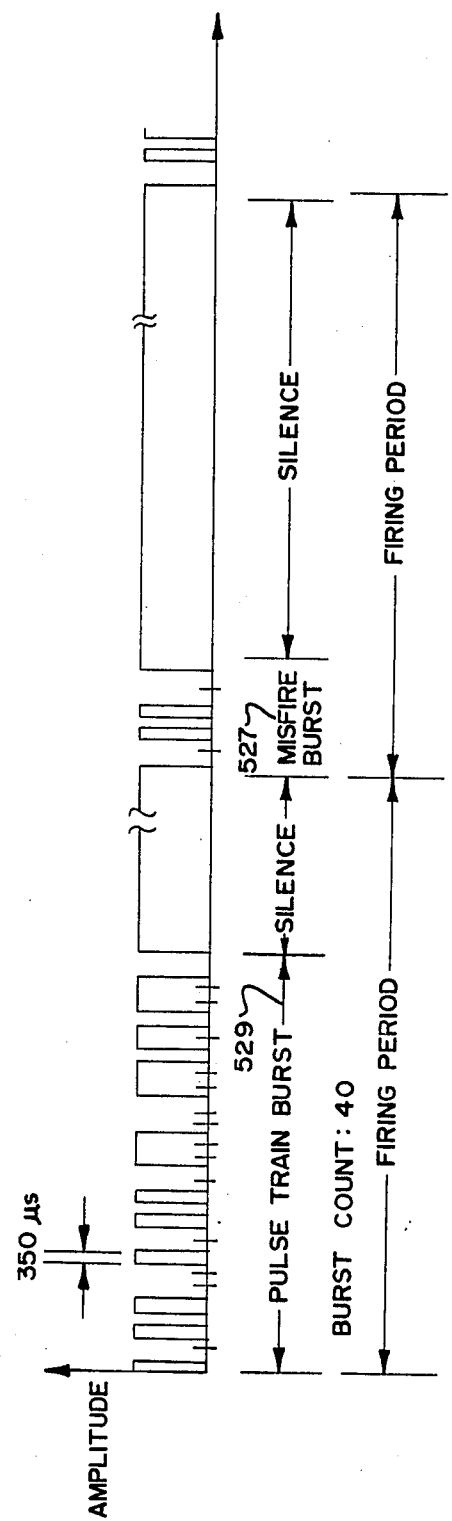
FIG. 6 is a representative trace of the audio output at misfire.

The audio output is more fully explained in FIGS. 4–6. To create a sound characteristic of a motorcycle, we have chosen to create a unit of measure called the firing period (block 520) which includes a pulse train burst (block 522) and a period of silence (block 524). The firing period 520 is repeated so long as the system is running. As illustrated on FIG. 4, a series of positive going pulses of varying widths are generated during the burst portion (block 522) and have an overall period of 40 units, each unit corresponding to 350 microseconds and the silent period being 75 units. The overall firing period therefore is 115 units.

As will be explained hereinafter in the appropriate flow chart, to change the frequency of the sound in response to increasing velocity of the vehicle, the firing period (block 520) is shortened but it is only the silent period (block 524) which is actually reduced leading to a trace such as shown in FIG. 5 wherein the second pulse train burst (block 526) follows the end of burst 525 with no silent period. This is effectively the highest speed output generated by the system. "Gear shifting" is provided to keep all realistic velocities usable by the system.

To add realism to the system, a "misfire" sound is generated at random intervals. This misfire sound is created by truncating the pulse train as shown in FIG. 6 where the misfire burst (block 527) is much shorter than the normal burst (block 529) as the silent period is much longer. The probability of a misfire depends on the frequency of the output at that time. A lower speed (i.e., longer firing period) will result in more misfires. At the beginning of each firing period, a random number is generated and masked with a number from a look-up table. The result of an AND operation with the mask produces a result which, if zero, results in a misfire. By substituting different masks, the probability of a misfire at higher speed is reduced.

Figure 7:
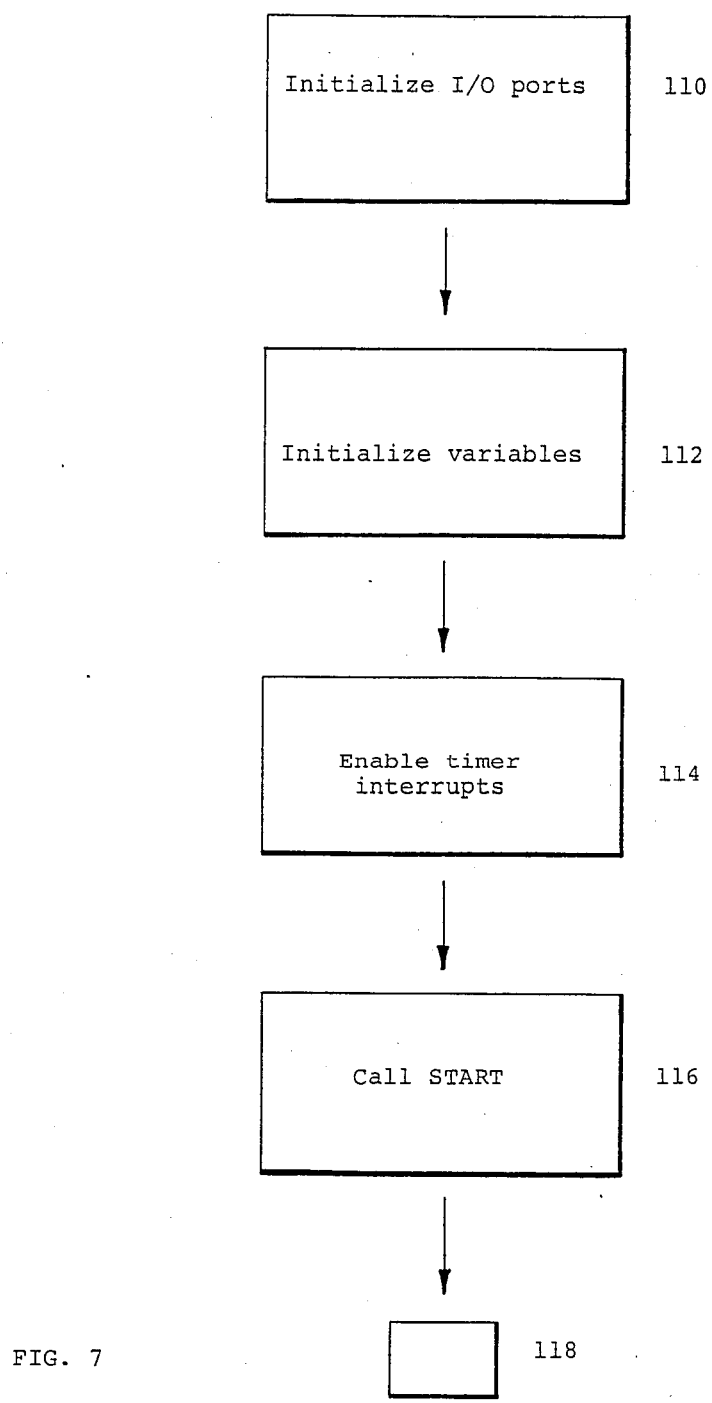
FIGS. 7-26 are block diagrams which illustrate the function of the preferred embodiment.

Turning now to the flow charts wherein the operation of the system is explained in detail, FIG. 7 illustrates the initialization routine. First all input and output ports are initiated (block 110). Thereafter, the program variables are initialized (block 112), timer interrupts are enabled (block 114) and the system proceeds to generate sounds with the starts up routine (block 116). All of this begins after switches 54 and 52 have been closed.

Figure 8:
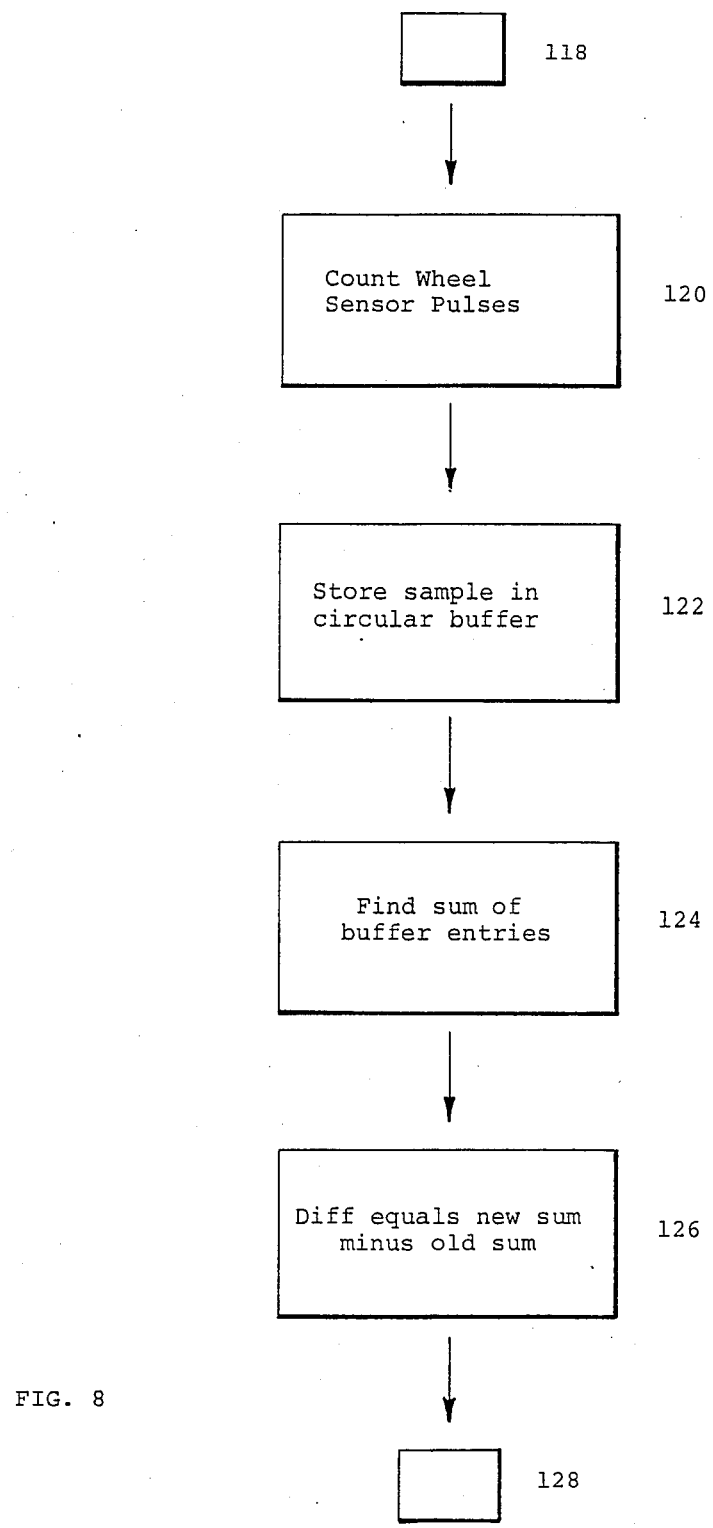

Bridging FIGS. 7 and 8 is the connecting block 118. The main sub-routine shown on FIG. 8 begins by calculating the firing period based on the vehicle wheel speed and present "gear" number. The gear number is also a function of wheel speed. To determine the gear number, it is first necessary to find a running average of pulses from the sensor. A running average is used to smooth out abrupt changes. According to the flow-chart, first the number of pulses coming from the wheel sensor are counted during a fixed interval of 192 units (350 microseconds each although at start a period of 450 microseconds can be used to create a lower tone) (block 120). Then, the count is stored in a 14 byte circular buffer (block 122) to maintain the running average. The buffer entries are summed (block 124) and the difference between the previous sum and the new sum indicates the rate of change in the wheel speed (block 126) and therefore the rate of acceleration or deceleration.

Figure 9:
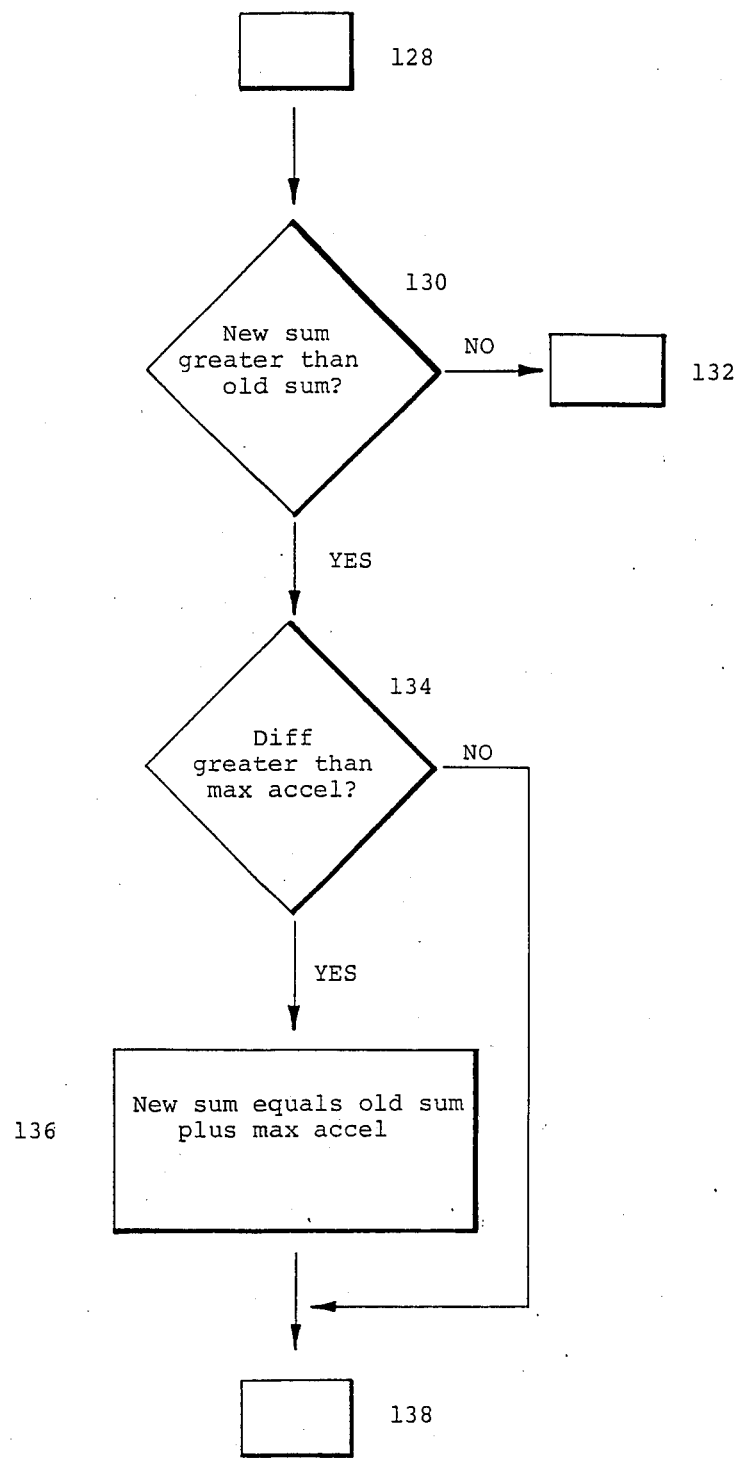

Block 128 carries over the flow-chart from FIG. 8 to FIG. 9. A determination of whether the acceleration is positive or negative is made (block 130). If negative, the sub-routine designated by number 132 is followed (explained hereinafter). If positive, a determination is made whether the differential is greater than a predetermined maximum acceleration allowed (block 134). If so, the sum is reduced to the maximum acceleration allowable (block 136). If not, block 136 is skipped. The purpose for limiting the rate of acceleration is to prevent an unrealistic "racing" sound which would be produced. Block 138 provides transition in the flow-chart to FIG. 10.

Figure 10:
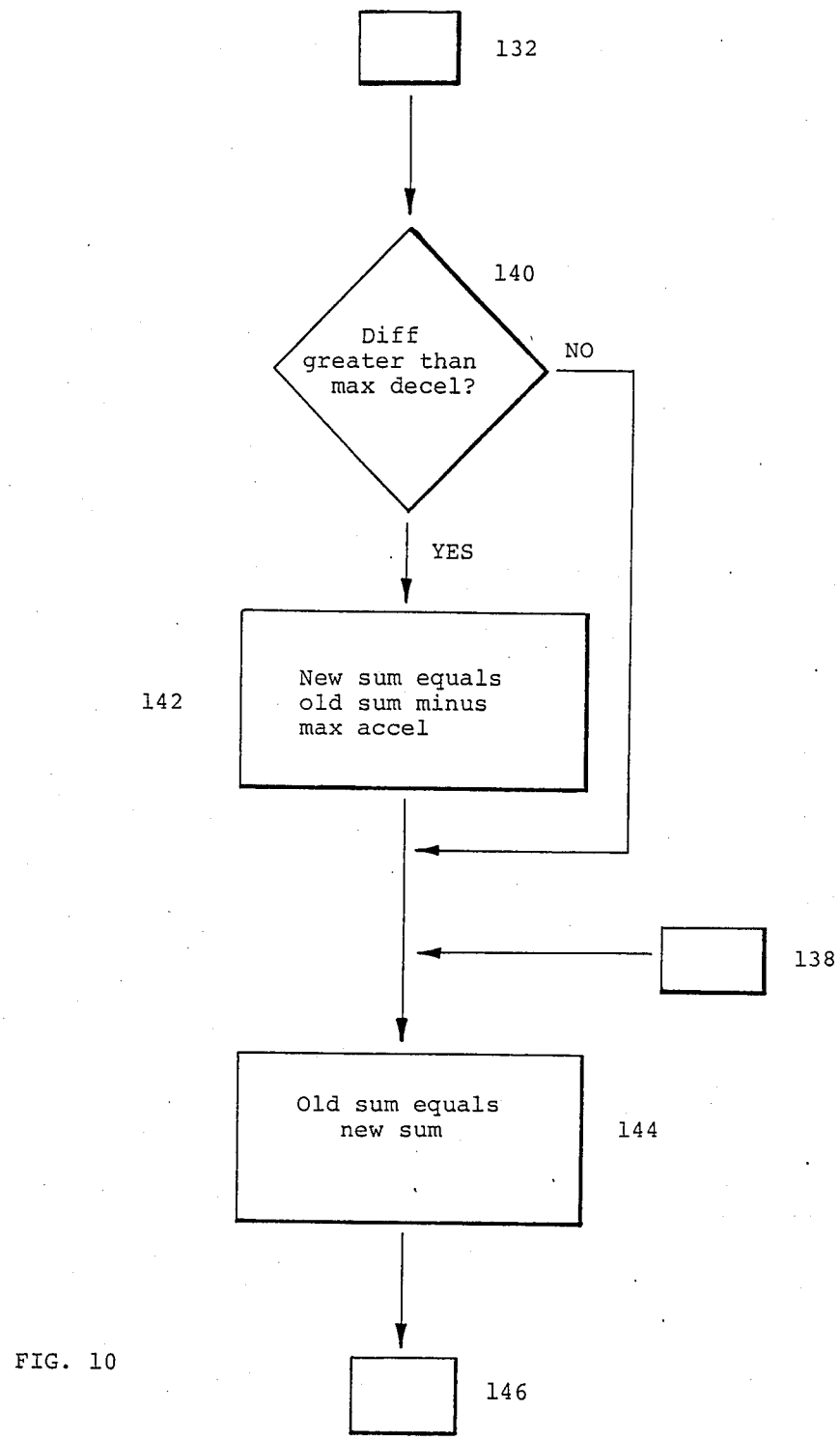

FIG. 10 illustrates the entry point for block 132 (deceleration circumstance). Looking to FIG. 10, in the event that the change in acceleration was negative (block 132) a determination is made as to whether this deceleration was beyond the maximum predetermined value (block 140). If so, this deceleration is reduced to the predetermined value (block 142). Then the new sum replaces the old sum in memory (block 144). Block 146 provides the transition to the next flow-chart shown in FIG. 11.

Figure 11:
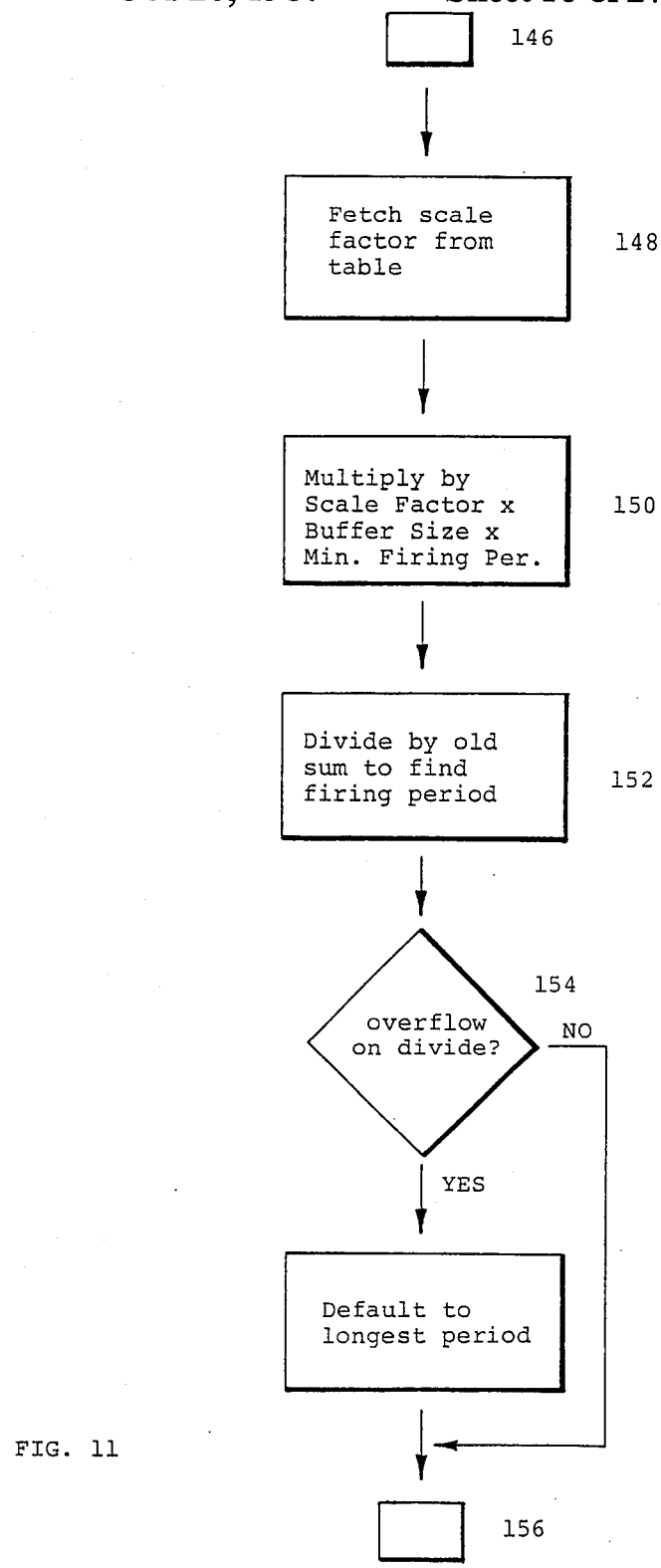

In the flow-chart shown in FIG. 11, a calculation is made of the firing period which is mathematically determined by multiplying a minimum value of 18 time units times a scale factor and the number of entries in the buffer (=14) (block 150) divided by the sum of entries in the buffer (block 150).

The scale factor is found from a look-up table from preprogrammed tables (block 148) and is essentially the "gear ratio". Their numerical values are chosen according to the desired audio frequency at any particular vehicle velocity.

If there is an overflow as a result of division (block 154), a default value is selected as the longest allowable firing period which corresponds to the "idle" speed. Without the default, the sound would stop, giving the effect that the motor had "died". Block 165 provides the transition to FIG. 12 of the drawings.

If the result of the division produces a period which is less than predetermined points of shifting to a higher gear (block 158), the gear number or scale factor is incremented (block 160). In such case, the program then reverts back to the sub-routine indicated by block 146. Otherwise, a test is made to determine if the period length is greater than the present downshift point (block 162). If it is, the gear number is decremented (block 164) and the program proceeds to sub-routine indicated by block 166.

Figure 13:
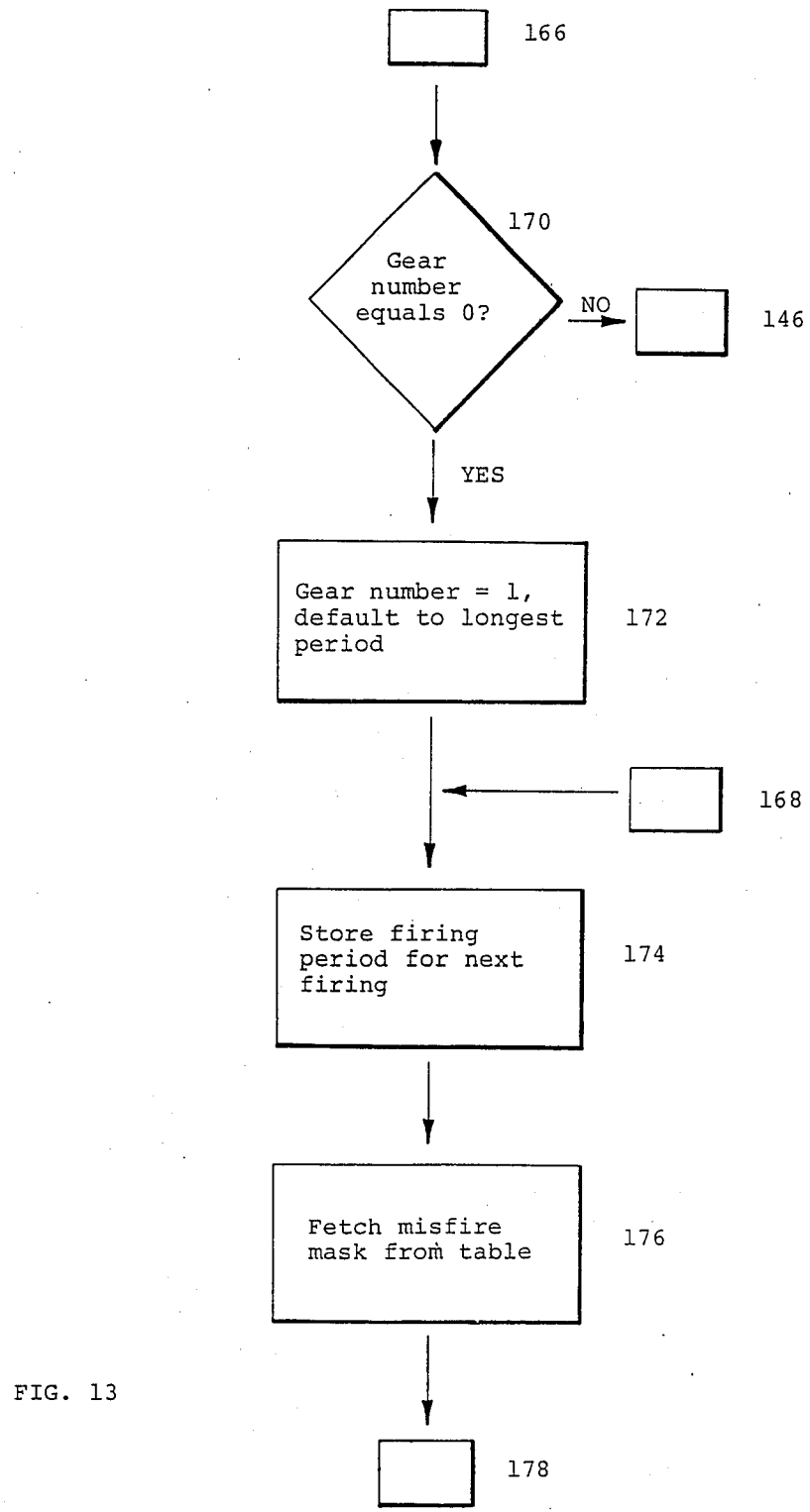
Figure 14:
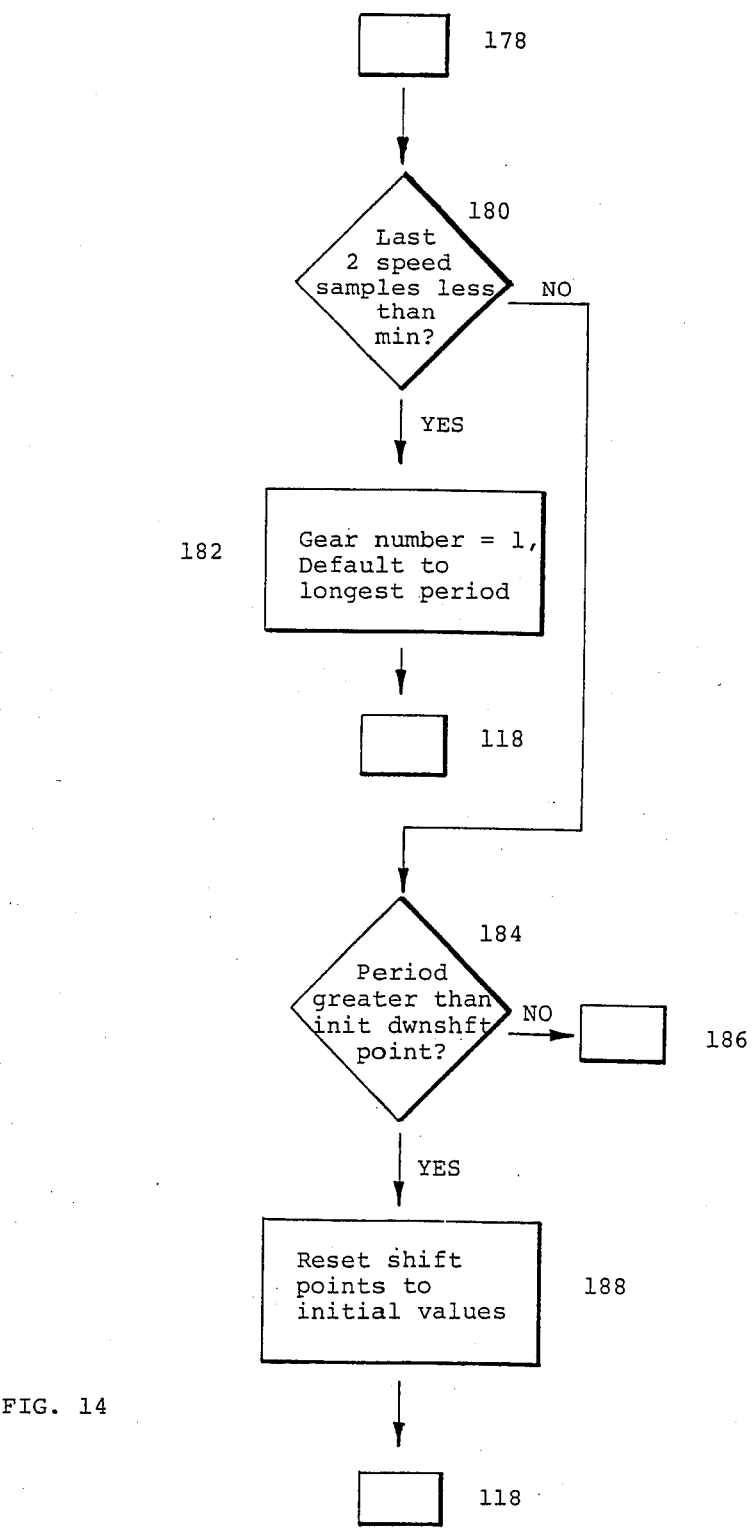

If the period is not greater than the downshift point, the program proceeds to sub-routine indicated by block 168. FIG. 13 starts with block 166 and begins by testing to determine if the gear number is zero (block 170). If it is, it is replaced by the default value of 1 (first gear) with the longest period available. Thus, the speaker will be producing an idle sound (block 172). If the gear number was not equal to zero, the program proceeds to the sub-routine shown in FIG. 7 beginning with block 146.

Figure 12:
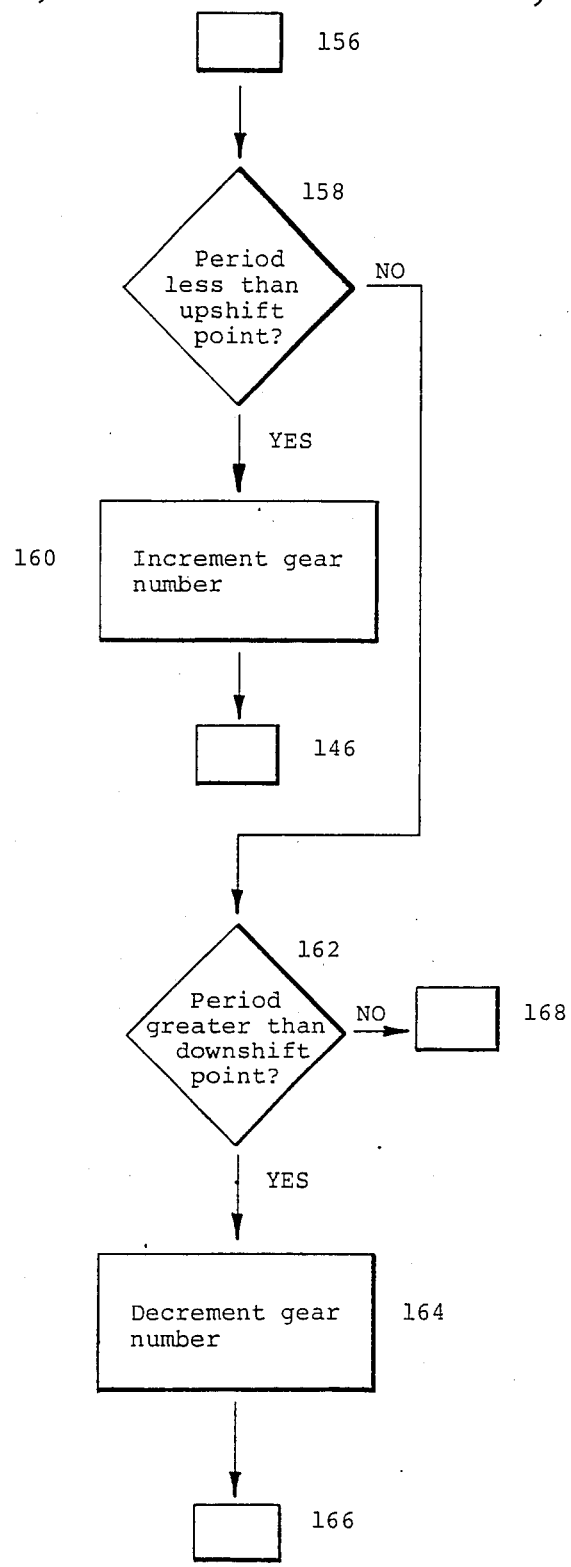

With the gear number set to 1 or an entry into the system through block 168 in FIG. 12 (which is a period not requiring downshift), this period is stored in memory awaiting the next pulse from the timer interrupt routine (block 174).

Figure 22:
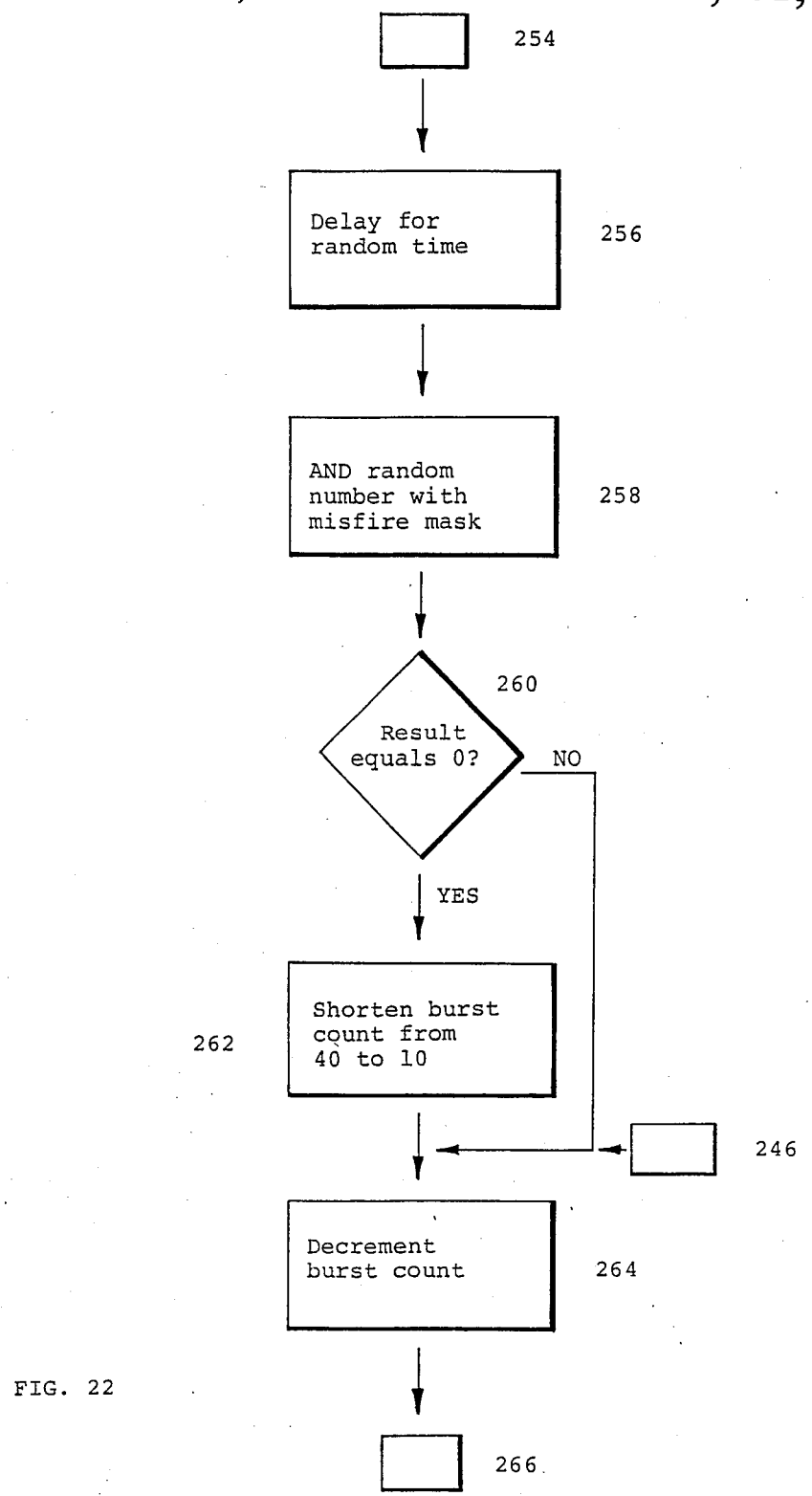

To create additional realism, a "misfire" sound is generated occasionally. This is accomplished by fetching a mask byte from a look-up table. The mask is used to determine if the current firing period is a misfire. The mask value depends on the length of the firing period and the probability of a misfire decreases as the period decreases (that is, engine speed increases) (block 176). The misfire condition is calculated as follows. A 16-bit number is generated by a random number generator of which the lower eight bits are used. Eight bits are masked by a number in a look-up table which includes some zero bits, and it is the number of zero bits which actually determine the probability for misfire. A misfire is ordered if the masked byte combined by an AND operation with the random number produces a zero result. At higher speeds, the mask has fewer zero bits and at lower speeds it has more. In the lowest speed, the mask byte has six zero bits and two non-zero bits making the probability of a misfire one in four. If a misfire is ordered, the firing period is altered as shown in FIG. 6 so that the misfire burst has nine time units (of 350 microseconds) and the remainder is silent. (This paragraph should be moved down to the position where FIG. 22 is located). The sub-routine continues on FIG. 10 from block 178.

A test is then made to determine if the last two speed samples were less than the minimum (block 180). If they are, the assumption is made that the bicycle has stopped and that the system should go to idle. This is to prevent an unrealistic sound of rapid downshifting in a "skid" situation. The gear number is then changed to 1 and the longest period (default) is substituted in memory (block 182) and the program reverts to its starting point 118 in the main sub-routine. If the speed was not less than the minimum for the last two samples, a determination is made whether the present period is greater than the initial downshift point established earlier (block 184). If not, the program proceeds to the sub-routine indicated by numeral 186, otherwise the upshift and downshift are returned to their initial positions (block 188) and the program proceeds back to the beginning sub-routine 118 in FIG. 4.

Figure 15:
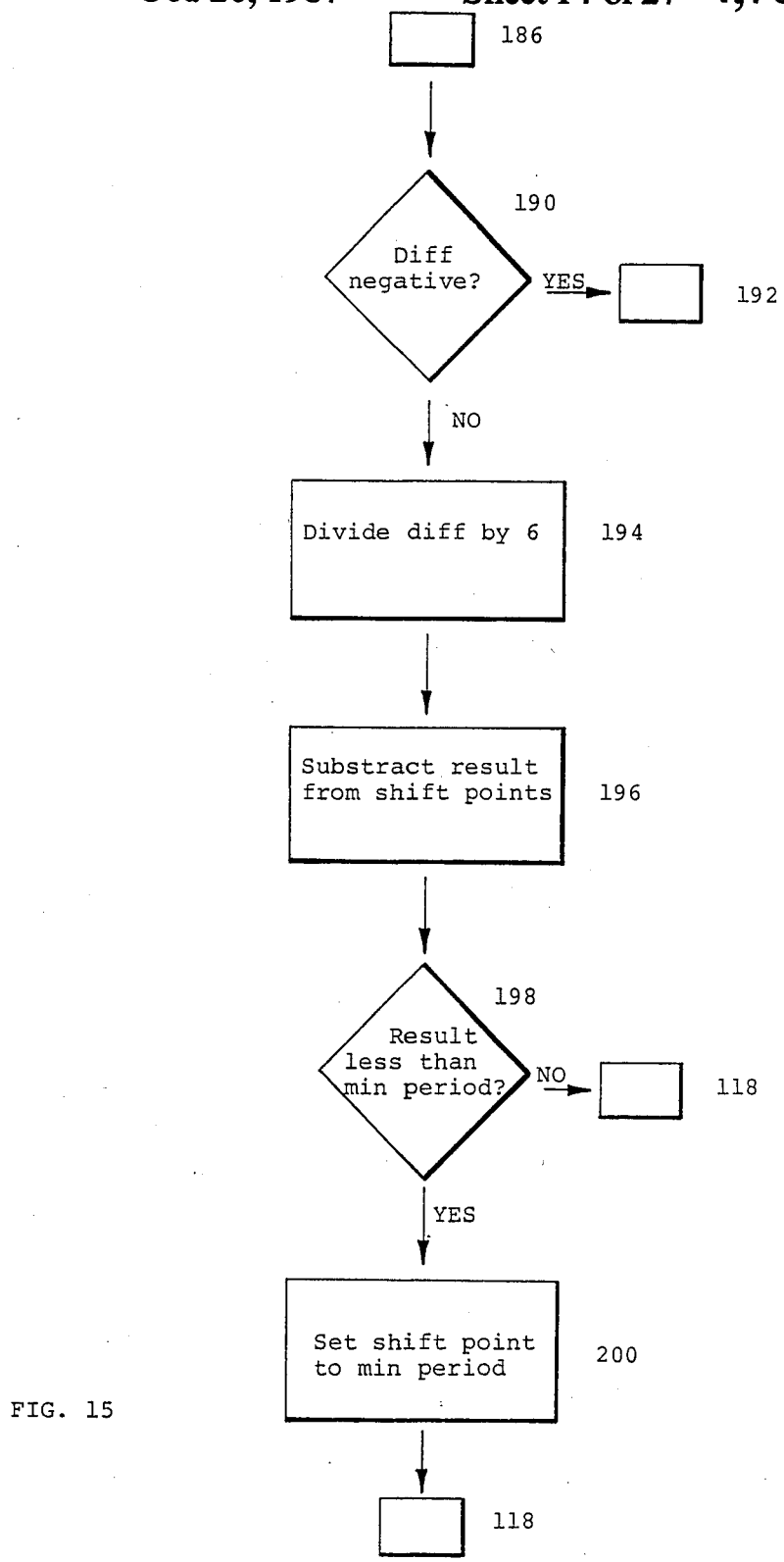

The shift set-points are now adjusted according to the rate of acceleration or deceleration. A high rate of acceleration will cause the shifting points to occur at higher speeds (i.e., shift up later). A high rate of deceleration will cause the shift point to occur at lower speeds. Skipping to FIG. 27, there can be seen a schematic trace of a representative engine speed versus vehicle speed in relative terms. On the velocity scale, shift points a, b, c and d are shown. Points a and b and all space therebetween correspond to the shift from first to second gear and it can be understood that the shift point will move from point a toward point b as the frequency (engine speed) increases as shown on the vertical scale. It is also worth noting that the minimum frequency which occurs right after a shift is greater at every succeeding gear as one would expect in operating a motorcycle to avoid the condition known as "lugging". A test is therefore made to determine whether the activity is acceleration or deceleration (block 190). If deceleration, the program proceeds to sub-routine indicated by block 192. For acceleration, the rate (namely the change in velocity) is divided by a scaling factor 6 (block 194) and the truncated result (no fractions) is subtracted from the current shift point, in effect reducing the firing period. The result is that shifting will occur at a higher engine speed (block 196). If the result of this decrease in shift point is less than the minimum shift point (block 198), the shift point is set to its predetermined minimum (=18 units) (block 200) and the program returns to block 118 in FIG. 8 in either case. (This is FIG. 15).

Figure 16:
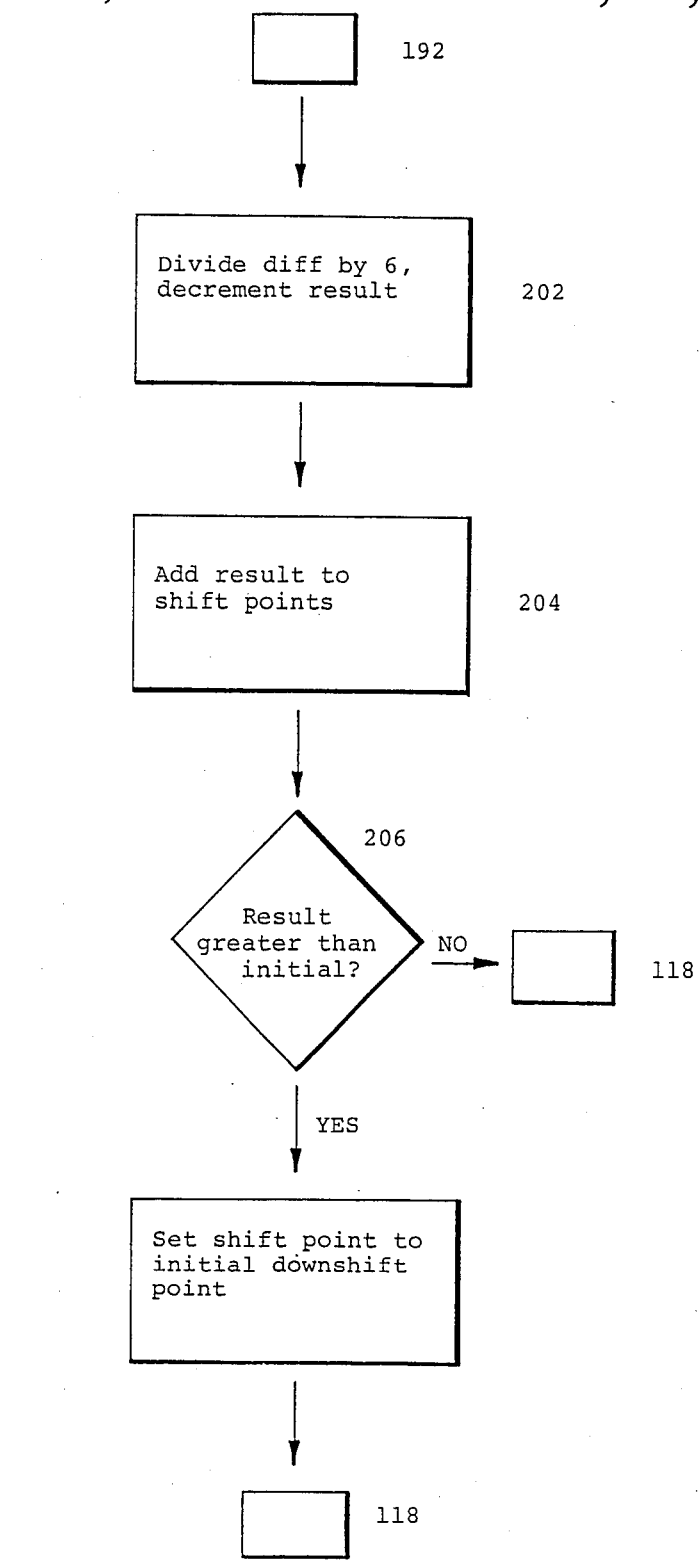

In FIG. 16, deceleration, as detected by the result of block 192, is considered. The rate of deceleration is scaled by a factor 6 and the result is decremented from the current shift point (block 202). The result is further decremented by one and truncated so that the deceleration will have less effect on moving shift points than equivalent acceleration.

The new shift points are then determined by addition of this truncated value (block 204). If the result of the addition is greater than the initial value (block 206), then the shift point is set at the minimum (i.e., their initial values) (block 207), then return to sub-routine 118 in either case.

Figure 17:
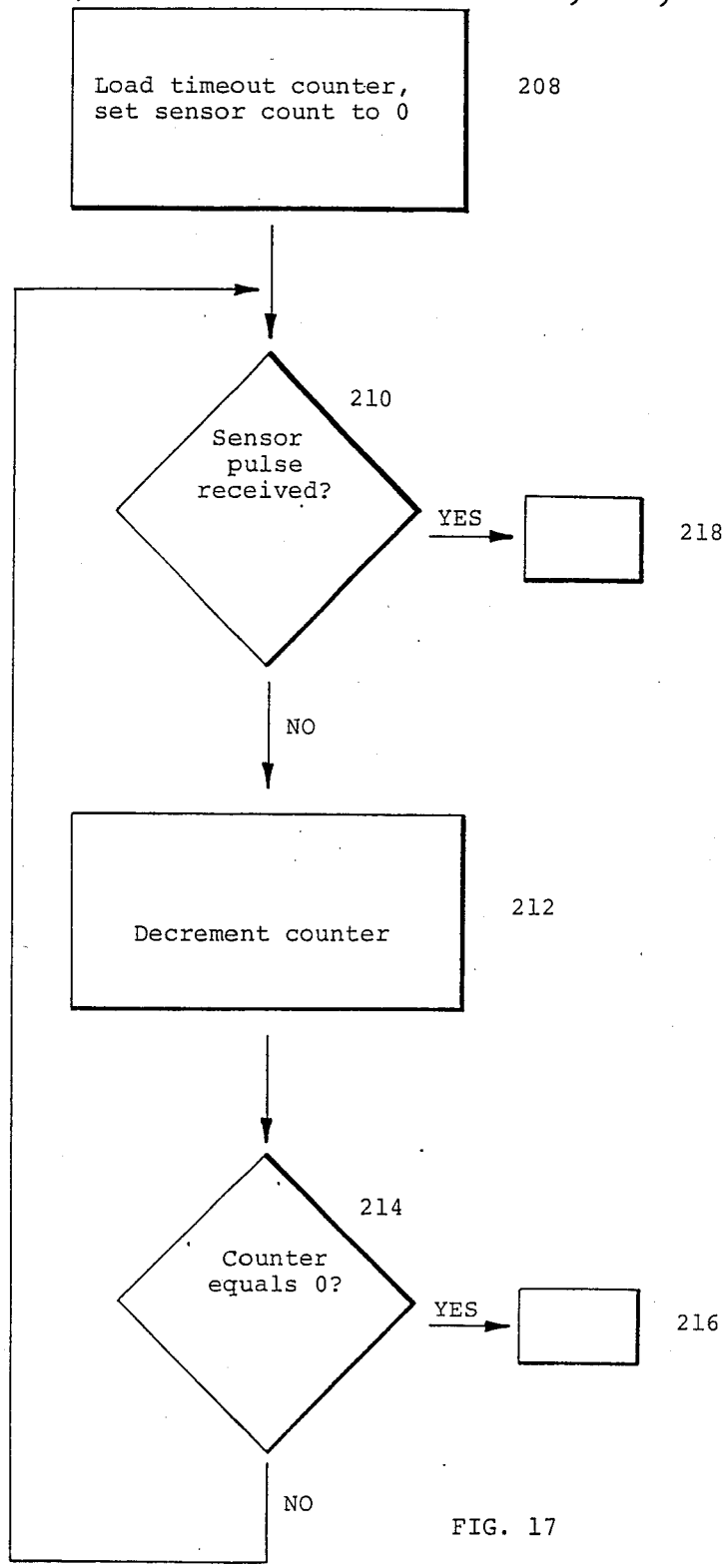

FIG. 17 illustrates the sub-routine which enables the sensor interrupts and decrements the sample interval counter during which the wheel sensor pulses are enabled and counted. First, a "time out" counter is set to an initial value and the sensor pulse counter is set to zero (block 208). After the initial value is set in the counter, a determination is made to see if the sensor 16 has stopped (block 210). If it has, either the wheel is stopped or the sensor is broken. If no sensor pulse is received, the time out counter is decremented (block 212) and a determination is made if the time out counter equals zero (block 214). If it does equal zero, the program exits to block 216 and returns a sensor pulse count of zero indicating that no sensor pulses were received during the time out period. If a pulse has been received as indicated by block 210, the program exits to a sub-routine indicated by block 218.

Figure 18:
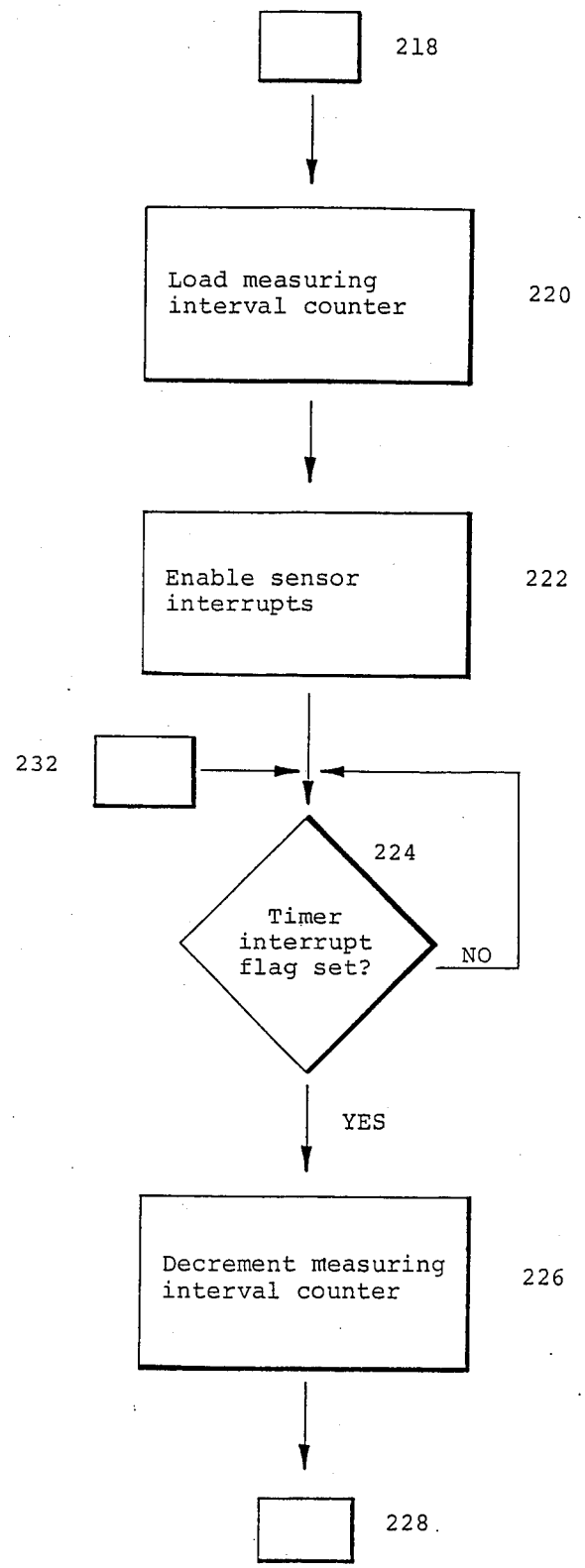

FIG. 18 illustrates the sub-routine beginning with block 218 wherein the interval counter is set to the number of timer interrupts in the sampling interval (192 timer interrupts) (block 220). Sensor pulses are counted during this sampling interval.

The system then enables the interrupt (INT) input on the microprocessor 30 allowing the wheel sensor interrupt routine to increment the sensor pulse counter (block 222).

A determination is made as to whether a time interrupt has actually been received (i.e. flag set) (block 224). If not, a loop back to block 224 provides continuous testing until such time as the flag is set. Once it is set, the interval measuring counter is decremented (block 226) and the program proceeds to the sub-routine indicated by block 228.

Figure 19:
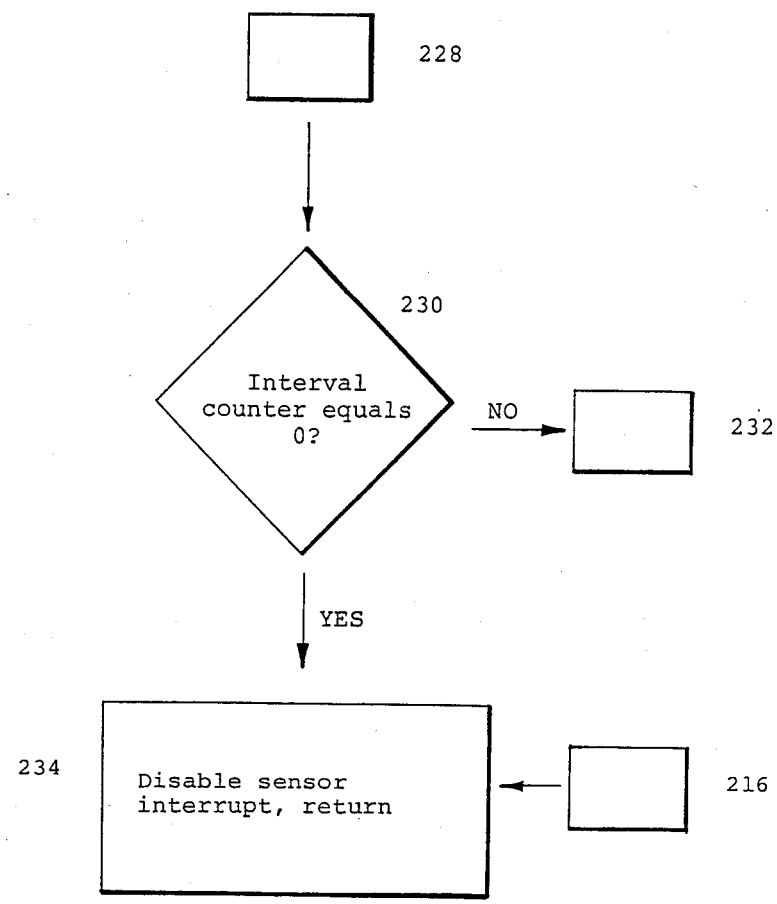

FIG. 19 illustrates a sub-routine beginning with block 228 and includes a determination of when the interval counter reaches zero which means, in practical terms, whether the sampling interval is complete. If not, the program loops back to block 224 as illustrated in FIGS. 18 and 19 by entry block 232. If the sampling period is over, the sensor interrupt input is disabled and the program returns to block 234. In addition, block 234 has the entry point for block 216 from FIG. 20.

Figure 20:
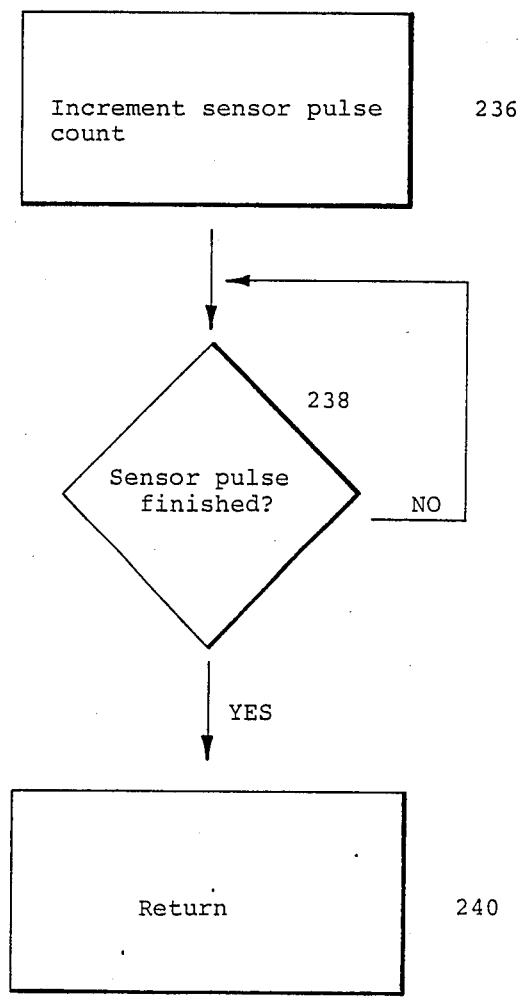

In FIG. 20, there is shown the sensor interrupt routine. When enabled, a pulse from the wheel sensor causes this routine to be called. In the first block (block 236), the pulse counter is incremented and then a decision is made as to whether the sensor pulse is completed. This prevents multiple interrupts to be generated from a single pulse (block 238). If the pulse is not finished, the system moves back and re-tests. Otherwise, the routine is exited and the system returns to block 240.

Figure 21:
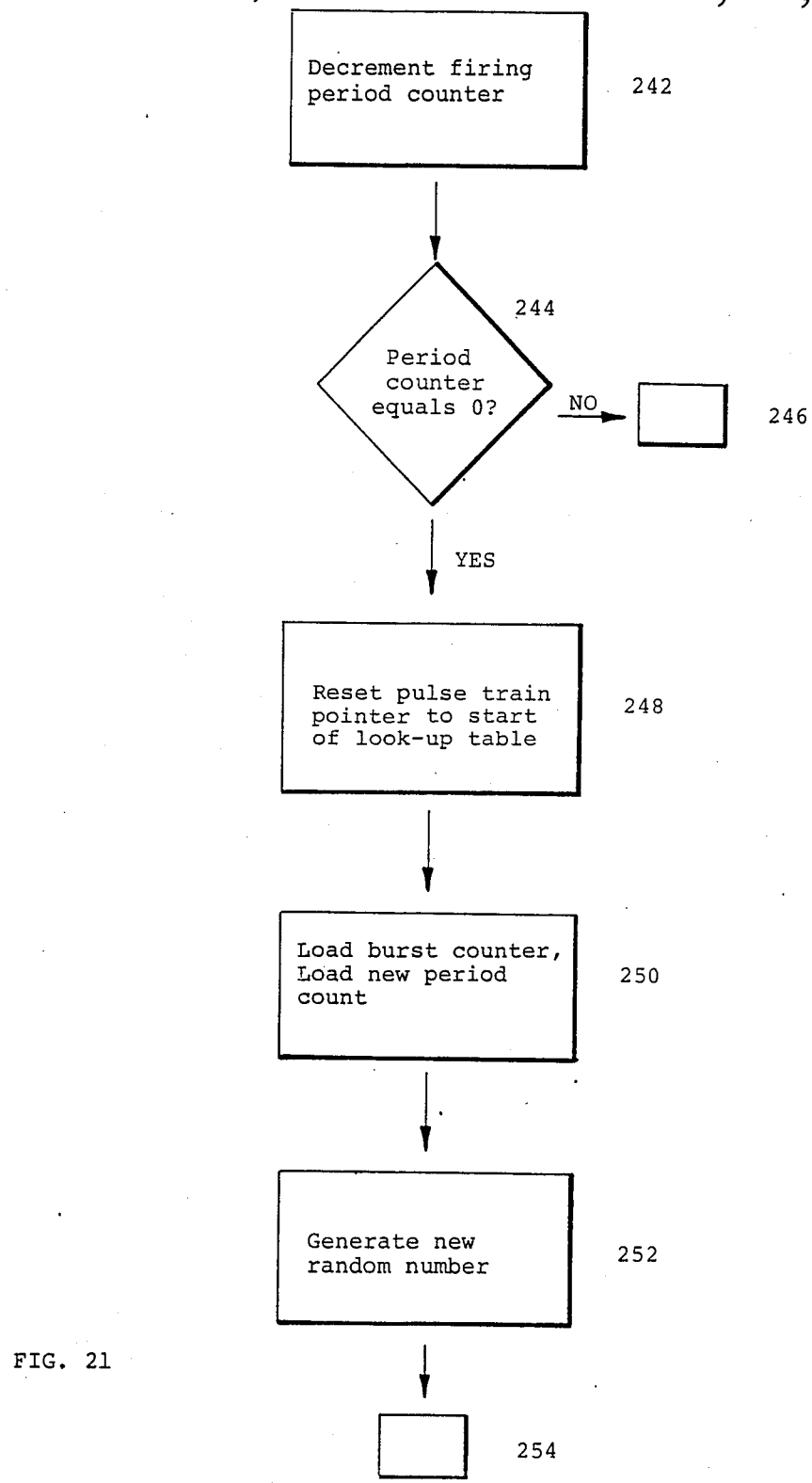

FIG. 21 illustrates a sub-routine for the timer interrupt. The internal timer causes an interrupt to occur every 350 microseconds. This interrupt routine gets the pulse train data from a table and sends it to the audio output. The pulse train which corresponds to the engine speed is calculated by the main routine. The system begins by decrementing the firing period counter (block 242).

Then the decision is made to determine whether the period counter is equal to zero (block 244). This is to determine whether the end of the current pulse train has been encountered. If not, the program jumps to a new location (to be explained hereinafter) and is illustrated by transition block 246. On the other hand, if the counter does equal zero, this is an indication that the pulse train is finished and that data table pointer is reset to the initial position (block 248).

The new period count calculated by the main routine that starts at block 118 is then loaded into the firing period counter and a burst counter is initialized to its longest period 40 (block 250).

The system generates a random 16 bit number (block 252) and the program proceeds to the sub-routine indicated on FIG. 22 via transistion block 254.

The sub-routine continues on FIG. 22. A short delay is added corresponding to the random 16 bit number before starting the new pulse train (block 256). This delay causes the effect of a slight engine jitter or unevenness which eliminates and unnatural periodicity which is heard as a hum or buzz at the firing frequency.

A random number is also used to generate a misfire as explained above in connection with FIG. 6. The lower byte of the random number generated above (block 254) is ANDed to the "misfire mask" from a look-up table (block 258), and the result is tested to determine if it is equal to zero (block 260).

Figure 23:
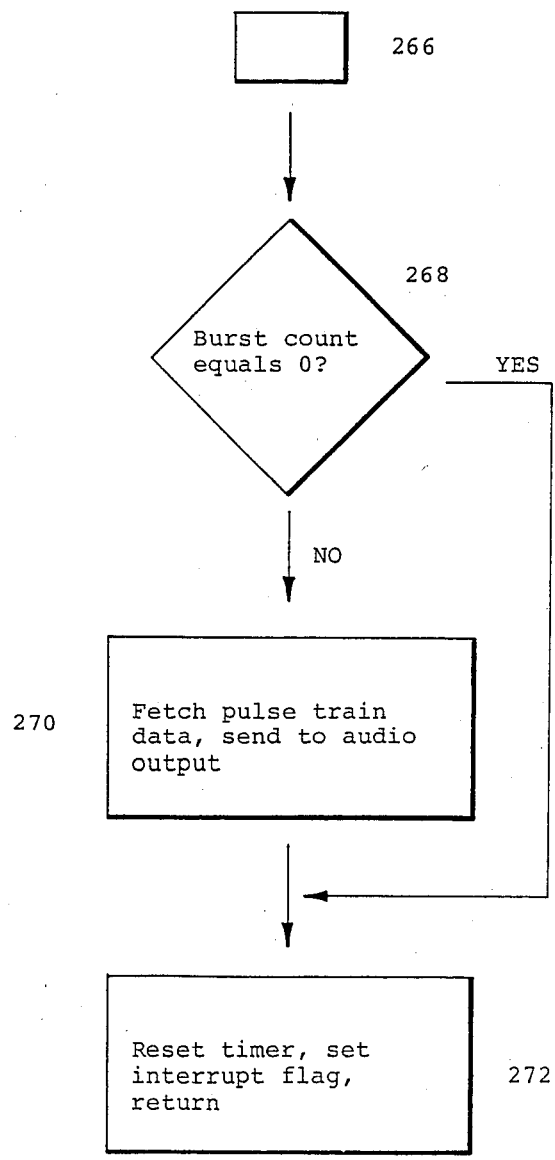

If it is equal to zero, a misfire is generated by shortening the length of the pulse train burst from 40 to 10. Thereafter, the burst count is decremented (block 264). This is also the entry point for transistion block 246 from FIG. 21. The system then continues on FIG. 23 by a transistion block 266.

If the burst count equals zero after decrementation (block 268), then the burst is done and no more data will be output during the current pulse train period. In such case, the pulse train data is then sent to the audio output (block 270). Otherwise, a reset is sent to the timer to cause the next interrupt in 350 microseconds and the timer interrupt flag for the sensor pulse counting routine is also set and the program returns to calculating firing period, etc.

Figure 24:
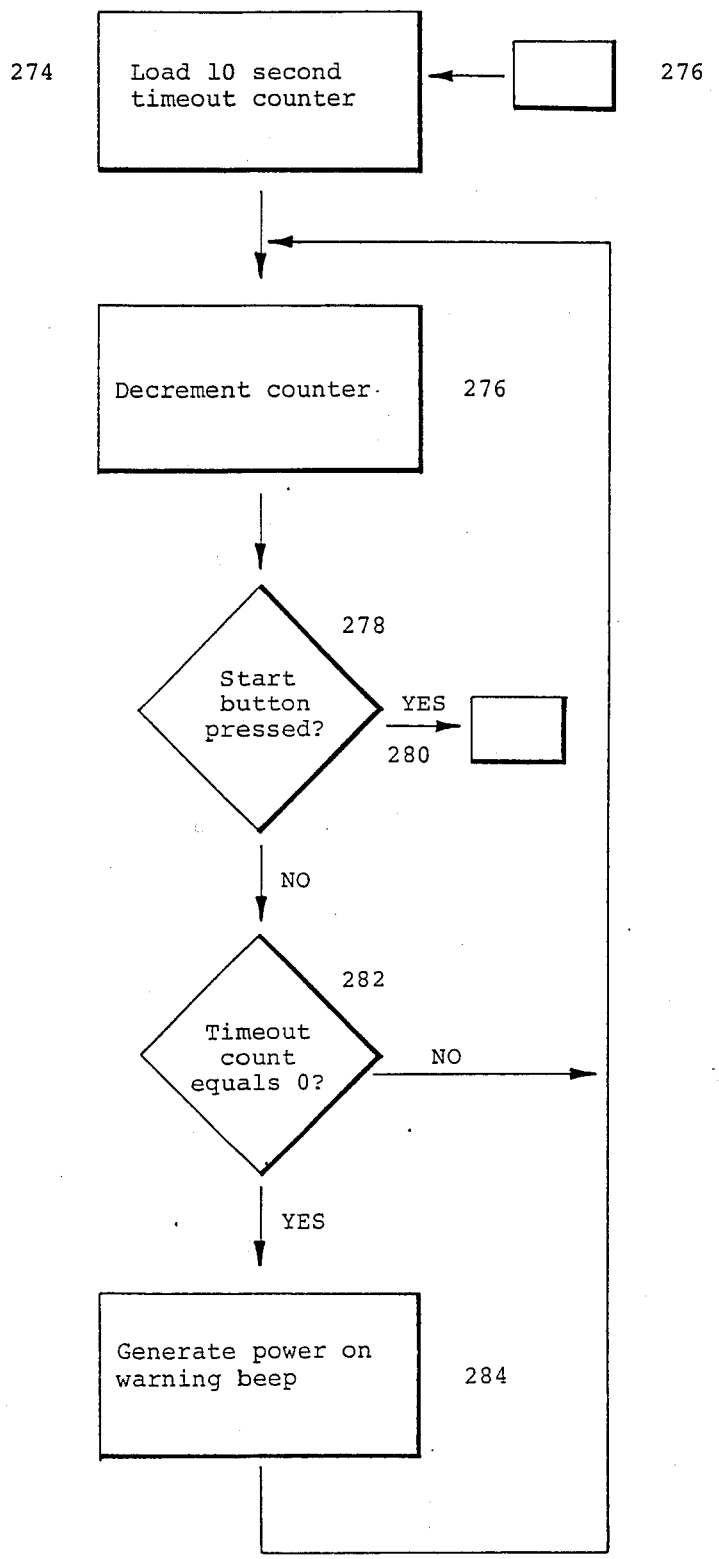

FIG. 24 details the start routine which generates a sound which simulates a "kick" start typical of motorcycles. First, a period of 10 seconds is loaded into the timeout counter (block 274). This is also the entry point for block 276 detailed hereinafter.

The counter is then decremented (block 276). If the starter button has been depressed (block 278) the program reverts to sub-routine indicated by transistion block 280. If not, a determination is made if the timeout is now down to zero (block 282). If not, the program loops back to block 276. Otherwise, the program generates a power on warning "beep". The purpose of this beep is to send a warning to the operator that the power of the system has been left on so as not to run down the batteries if there is no intention to start the simulator (block 284). The program then reverts back to block 276 and the cycle resumes.

Figure 25:
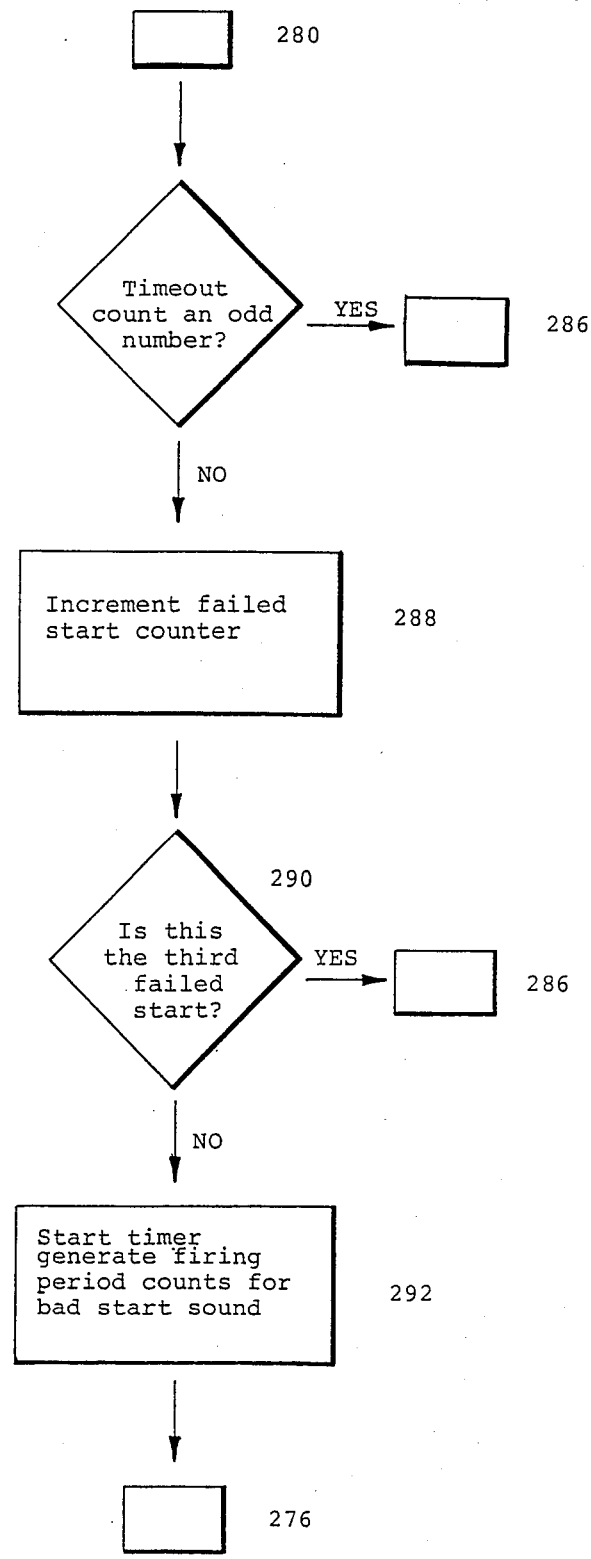
Figure 26:
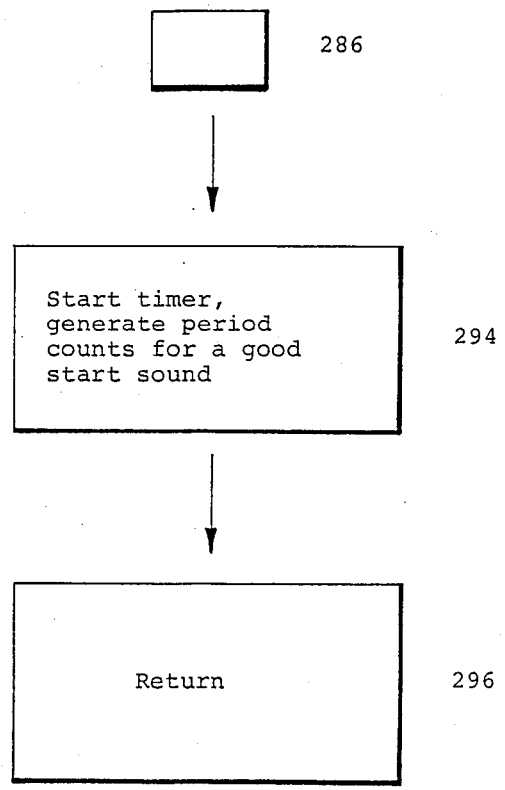

FIG. 25 begins sub-routine from transistion block 280 in FIG. 24. A determination is made if the time on counter has an odd number. An odd number is used to determine a successful start while an even number is used to generate a failure to start. In the case of an odd number, the program continues via block 286.

If it is an even number, incrementation of the "failed start" counter is made (block 288). If this is the third failed start (block 290), the program jumps to the sub-routine indicated by block 286, otherwise, sounds are generated corresponding to a failed start (i.e. low firing rate that gradually becomes lower, stopping completely after about a half second). These values are stored in a look-up table (block 292).

The program then reverts back to block 276 which is the beginning of the start routine shown in FIG. 25.

Block 286 from FIG. 25 (in the case of a proper start) starts the interrupt timer and draws from memory a pulse train which produces an audible sound of a short revving period followed by idling (block 294).

The program then returns to block 296.

Figure 27:
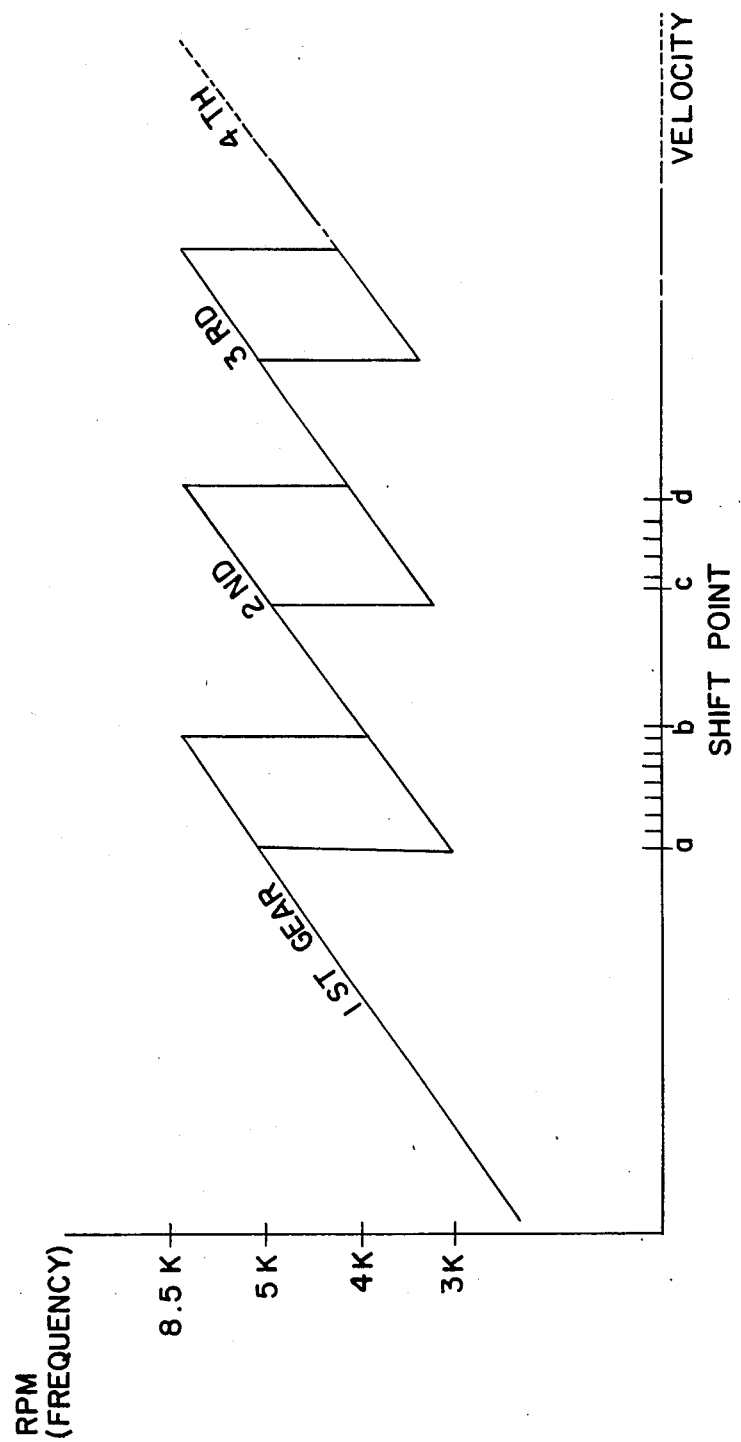
FIG. 27 is a representative trace of wheel speed versus vehicle velocity.

FIG. 27 illustrates the object code in Intel standard hex format for a preferred embodiment of the present invention. This object code contains sub-routines as generally described herein which could be likewise generated by a person skilled in this art based on the above flow-charts and using a proper compiling device.

It can be appreciated that the above detailed description describes an audio simulator for a non-motorized vehicle which is capable of realistically simulating most of the characteristic sounds and functions of a motorcycle in this case. It should be likewise appreciated that the basic sub-routines detailed herein can be adapted to simulate related vehicles without departing from the spirit of the invention.

Numerous characteristics and advantages of the invention have been set forth in the foregoing description together with details of the structure and function of the invention. The novel features thereof are pointed out in the appended claims. The disclosure however is illustrative only, and changes may be made in detail within the principle of the invention to the full extent intended by the broad general meaning of the terms in which the appended claims are expressed.

What is claimed is:

1. A motorcycle simulator for use on a non-motorized vehicle, comprising:
   (a) means for producing an electrical signal proportional to the velocity of the non-motorized vehicle;
   (b) means for determining the acceleration of the vehicle from said signal;
   (c) means for producing an audio output corresponding generally to the sound of a motorcycle at the particular velocities;
   (d) means for providing step-wise continuous changes in said audio output frequency, said changes occurring at particular velocities and accelerations and producing an audio characteristic corresponding to shifting of gears on a motorcycle; and
   (e) a starting sequence which randomly determines whether attempted starting of the simulator will produce an audio output corresponding to a rising frequency and then back to an idle frequency corresponding to a start condition or alternatively an increasing frequency followed by a decreasing frequency to zero corresponding to a non-start condition.

2. A simulator according to claim 1 wherein said particular velocities are changeable in response to the rate of acceleration detected during each period of increasing frequency and wherein the velocity where a gear shift output is produced is reduced for greater rates of acceleration so that rapid acceleration of the vehicle results in earlier gear shifting.

3. A simulator according to claim 1 including a starting sequence which randomly determines whether attempted starting of the simulator will produce an audio output corresponding to a rising frequency and then back to an idle frequency corresponding to a start condition or alternatively an increasing frequency followed by a decreasing frequency to zero corresponding to a no-start condition.

4. A simulator according to claim 2 including means for detecting a deceleration to zero velocity and maintaining the audio output at a frequency corresponding to an idle sound of a motorcycle.

5. A simulator according to claim 2 including means for intermittently altering the audio output to produce a sound corresponding to a misfire of a motorcycle said misfire sound being generated randomly with a probability which increases with decreasing audio frequency.

6. A simulator according to claim 5 wherein a mask byte is ANDed with said random number on a bit by bit basis to produce a numbered result and a misfire is produced if said result equals a predetermined number, said mask byte being selected in relative to the current frequency of the audio output and wherein said selected mask byte has a higher probability of producing a misfire at lower audio frequencies.

7. A simulator accordinq to claim 1 wherein said audio output includes a firing period which has an audible pulse train burst component and a silent component and wherein higher audio frequencies are produced by shortening the silent portion.

8. A simulator according to claim 7 including a silent delay period of random length being inserted between each firing period, so that unnatural periodicity sounds will not be generated.

9. A motorcycle sound simulator for use in a non-motorized vehicle, comprising:
   (a) a sensor attached to said vehicle to detect rotation of a wheel and generate an electrical signal corresponding to the velocity of the vehicle;
   (b) means for generating an audio output which includes a firing period having an audible component of a series of pulses forming a pulse trail burst, and a silent period and wherein an audio output of varying pitch is produced by shortening the silent period;
   (c) means for step-wise increasing or decreasing the audio output frequency at predetermined vehicle velocities to simulate gear shifting sounds;
   (d) means for determining the acceleration of the vehicle in real time and altering the predetermined step-wise increases and decreases such that an increased acceleration rate results in step-wise increases at lower velocities and increased deceleration rate results in step-wise decreases at higher velocities;
   (e) means for intermittently producing a misfire sound effect at random intervals and inserting the effect in between firing periods, said effect being produced by generating a second first period having a silent period substantially longer than said pulse train burst, said effect being randomly inserted with a probability decreasing with increasing audio frequency; and (f) means for randomly producing a no-start effect when power is applied to the system, said effect including a rising audio frequency followed by a falling frequency to zero.

10. A simulator according to claim 9 including means for inserting a short silent delay period of random length between each firing period so that unnatural periodicities are reduced.

* * * * *